US009092332B2

(12) United States Patent
Taylor et al.

(10) Patent No.: US 9,092,332 B2
(45) Date of Patent: Jul. 28, 2015

(54) ACTIVITY BASED SAMPLING OF DIAGNOSTICS DATA

(71) Applicant: Microsoft Corporation, Redmond, WA (US)

(72) Inventors: Daniel J. Taylor, Redmond, WA (US); Vance P. Morrison, Kirkland, WA (US); Cosmin Radu, Redmond, WA (US); Bryan P. Arant, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 265 days.

(21) Appl. No.: 13/875,356

(22) Filed: May 2, 2013

(65) Prior Publication Data
US 2014/0331092 A1 Nov. 6, 2014

(51) Int. Cl.
*G06F 11/00* (2006.01)
*G06F 11/07* (2006.01)
*G06F 11/36* (2006.01)
*G06F 11/34* (2006.01)

(52) U.S. Cl.
CPC ........ *G06F 11/0787* (2013.01); *G06F 11/3466* (2013.01); *G06F 11/3636* (2013.01)

(58) Field of Classification Search
CPC .......................... G06F 11/0787; G06F 11/3466
USPC .......................... 714/35, 39, 47.1, 48; 706/45
See application file for complete search history.

(56) References Cited

U.S. PATENT DOCUMENTS

| 5,701,400 | A  | * | 12/1997 | Amado ............................ 706/45 |
| 5,768,496 | A  | * | 6/1998 | Lidgett et al. ..................... 714/25 |
| 7,266,726 | B1 | * | 9/2007 | Ladd et al. ........................ 714/27 |
| 7,395,458 | B2 |   | 7/2008 | Shrivastava et al. |

(Continued)

FOREIGN PATENT DOCUMENTS

EP 1089183 A2 8/2007

OTHER PUBLICATIONS

Gmelnik, "Semantic Logging Application Block (SLAB) 1.1 Activity tracing and sampling", CodePlex patterns & practices, Jul. 7, 2014, pp. 1-3, XP055132426, Retrieved from the Internet: URL:https://slab.codeplex.com/wikipage?title=ActivityTracingAndSampling [retrieved on Jul. 30, 2014].

(Continued)

*Primary Examiner* — Kamini Patel
(74) *Attorney, Agent, or Firm* — Kevin Sullivan; Kate Drakos; Micky Minhas

(57) ABSTRACT

Activity-based sampling provides useful and relevantly focused diagnostic data, connected to improve a developer's understanding. An application invokes log-event procedures, causing a logger to check logging conditions and make a log entry when a logging condition is satisfied. The logger has a set of log-enabled activities, and one or more start-events with respective sampling frequency conditions. One logging condition is that a current activity-id be log-enabled. Another states that if the current activity-id is not log-enabled but the log-event procedure identifies a start-event consistent with the sampling frequency condition, the activity is log-enabled and a log entry is made. Creation of a child activity by a parent activity which is in the set of log-enabled activities is noted in the log, and the child is automatically log-enabled. A log consumer may reside inside or outside the application. Event Tracing for Windows services can be enhanced to support activity-based sampling.

20 Claims, 8 Drawing Sheets

(56) References Cited

U.S. PATENT DOCUMENTS

| | | | |
|---|---|---|---|
| 7,792,919 B2* | 9/2010 | Gray et al. | 709/217 |
| 7,958,402 B2 | 6/2011 | Lee et al. | |
| 8,074,103 B2 | 12/2011 | Dilman et al. | |
| 2002/0124209 A1* | 9/2002 | Faust et al. | 714/37 |
| 2003/0188226 A1* | 10/2003 | Talcott et al. | 714/39 |
| 2004/0268314 A1 | 12/2004 | Kollman et al. | |
| 2005/0183068 A1 | 8/2005 | Cwalina et al. | |
| 2005/0273667 A1* | 12/2005 | Shrivastava et al. | 714/38 |
| 2005/0278706 A1 | 12/2005 | Garza et al. | |
| 2007/0074081 A1* | 3/2007 | DeWitt et al. | 714/45 |
| 2007/0174716 A1* | 7/2007 | Erdtmann et al. | 714/39 |
| 2007/0226540 A1* | 9/2007 | Konieczny | 714/26 |
| 2008/0276127 A1* | 11/2008 | McFarland et al. | 714/37 |
| 2011/0289361 A1* | 11/2011 | Kuiper et al. | 714/45 |
| 2012/0123981 A1* | 5/2012 | Graves et al. | 706/13 |
| 2014/0019092 A1* | 1/2014 | Phelps et al. | 702/185 |
| 2014/0068325 A1* | 3/2014 | Masser et al. | 714/15 |

OTHER PUBLICATIONS

PCT/US2014/036472, International Search Report and Written Opinion, mailed Aug. 8, 2014, 12 pages.

"Accessing Diagnostic Information in the Extended Events Log", Retrieved at <<http://msdn.microsoft.com/en-us/library/hh213095.aspx>>, Retrieved Date: Mar. 5, 2013, pp. 6.

"Configuring Tracing", Retrieved at <<http://msdn.microsoft.com/en-us/library/ms733025.aspx>>, Retrieved Date: Mar. 5, 2013, pp. 9.

"Managing Log Files and Diagnostic Data", Retrieved at <<http://docs.oracle.com/cd/E16764_01/core.1111/e10105/logs.htm>>, Retrieved Date: Mar. 5, 2013, pp. 15.

"Activity ID Propagation", Retrieved at <<http://msdn.microsoft.com/en-us/library/aa702742.aspx>>, Retrieved Date: Mar. 5, 2013, pp. 3.

"Event Tracing: Improve Debugging and Performance Tuning With ETW", Retrieved at <<http://msdn.microsoft.com/en-us/magazine/cc163437.aspx>>, 2007, pp. 12.

\* cited by examiner

ACTIVITY BASED SAMPLING OF DIAGNOSTICS DATA

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

A program's source code can be very helpful in understanding the program's behavior. But most if not all useful computation in commercial computing systems is too complex to be recreated mentally. In particular, even highly experienced and capable software developers who are faced with creating, debugging, or enhancing a commercial computing system do not rely solely on a visual inspection of source code or on attempts to simulate software execution mentally or on paper. Instead, the developers execute the software in order to watch what it does, or what it fails to do, during execution.

To improve their understanding of the software's actions during execution, developers use tools such as debuggers, profilers, embedded print statements, and diagnostic logs, which provide additional data as the software executes. Inspection of the program can then be aided by inspecting the data provided by the tools. However, each of these software development tools also poses technical challenges, e.g., how to obtain the tool data without altering the tool-free behavior of the program being inspected, how to avoid burying the tool data in a flood of irrelevant data, and how to connect different pieces of the tool data with one another in ways that improve the developer's understanding of the program that is being inspected.

SUMMARY

Some embodiments described herein are directed at the technical problem of how to obtain useful diagnostic data about a software program without burying that useful data in a flood of irrelevant data. Some embodiments are also directed to the technical problem of how to connect different pieces of diagnostic data with one another to help improve a developer's understanding of the program that is being diagnosed, particularly when the program spans multiple execution threads.

From an architectural perspective, some embodiments provide activity-based sampling of diagnostic data using a memory in operable communication with one or more processors. A set of event definitions residing in the memory defines events that a developer believes may shed light on the behavior of an application program. The application also resides in the memory, and has application code which is configured to invoke at least one log-event procedure. A current activity-id specifies whether an activity of the application is currently designated by or on behalf of the developer. When some activity is currently designated, the current activity-id also specifies which activity is currently designated.

In some embodiments, a logger residing in the memory has logger code which is configured to interact with the processor and memory to check a set of specified logging conditions and send a log entry to a log in response to invocation of a log-event procedure when at least one specified logging condition is satisfied. The logger includes a set of log-enabled activities, and also includes a set of one or more start-events with respective sampling frequency conditions. Each start-event is an event which is defined in the set of event definitions (although not necessarily defined there as a start-event).

In some embodiments, the specified logging conditions include a first condition specifying that the current activity-id is present in the set of log-enabled activities. In some, the specified logging conditions also include a second condition specifying that the current activity-id is absent from the set of log-enabled activities, that the log-event procedure identifies 304 a start-event, and that the invocation of the log-event procedure is consistent with the sampling frequency condition of the start-event.

In some embodiments, a start-event sampling frequency specifies that the invocation of the log-event procedure be an Nth logging attempt for a start-event which has a sampling frequency of one log entry per N log-event procedure invocations. In these and/or other embodiments, a start-event sampling frequency specifies that there have been less than M start events within a specified period of time.

Some embodiments include at least one set-activity-id procedure invocation configured to set the current activity-id. The set-activity-id procedure invocation(s) reside in at least one of the following: the application code, a framework which includes a runtime to support the application code. In particular, the application may be a C++ application, and the framework may include familiar standard C++ libraries.

In some embodiments, the application is a multi-threaded application. In some, the embodiment includes a current thread-id which identifies a currently executing thread of the application during execution of the application. In some, at least one log entry contains the current thread-id ("current" meaning current as of creation of the log entry).

Some embodiments include a set of thread-ids with corresponding activity-ids. The logger code is configured to retrieve the current activity-id by looking up the current thread-id in the set of thread-ids to find the corresponding activity-id and use it as the current activity-id.

Some embodiments include a performance monitor or other log consumer, which may be in the application or outside it. The log consumer's code is configured to send a sampling configuration message to the logger to specify at least one event as a start-event and to specify the sampling frequency condition for that start-event. The sampling configuration may be specified in other ways, in these and/or other embodiments, such as by configuration files, parameters controlled though a user interface, or otherwise familiar inter-process communication mechanisms adapted to convey a sampling configuration.

Some embodiments include a child-activity procedure invocation which is configured to notify the logger that a current activity is creating a child activity. In some embodiments, the logger code is configured to add the child activity to the set of log-enabled activities in response to the child-activity procedure invocation. In some, a log entry documents that the child-activity was created by an activity, which was the current activity at the time of child-activity procedure invocation.

From a procedural perspective, some embodiments perform a technical process for activity-based sampling of diagnostic data using a logger. Some embodiments configure the logger with data which represents a set of log-enabled activities and with data which represents a set of start-events with respective sampling frequency conditions. In some, data in the logger associates a thread-id with an activity-id, the thread-id identifying a thread of the computing system, and the activity-id identifying an activity which is performed at least in part by the identified associated thread. Some receive in the logger an indication of a log-event procedure invocation by an invoking thread, the indication specifying an event. Some determine whether any activity represented in the set of log-enabled activities is currently an activity of the invoking thread. If any activity represented in the set of log-enabled activities is currently an activity of the invoking thread, then the event is logged in a diagnostic data log. If no activity represented in the set of log-enabled activities is currently an activity of the invoking thread but the event is a start-event and the invocation of the log-event procedure satisfies the sampling frequency condition for the start-event, then the event is logged in the diagnostic data log and the activity of the invoking thread is added to the set of log-enabled activities.

Some embodiments provide a set of event definitions which define events. Specifically, the event definitions are provided to at least one of the following: an application, the logger, a log consumer. In some embodiments, the event definitions specify a level-of-detail for at least one of the events.

Some embodiments stop the logging for a particular activity, even when log space or other resources are available and the application program is executing activities. Some stop logging in response to at least one of the following: seeing a stop-logging event, seeing a start-event on a log-enabled activity again after previously seeing that start-event has triggered logging for the activity.

Some embodiments set a current activity-id in response to a set-activity-id procedure invocation. Some do so in at least one of the following: an application in the computing system, a framework which includes a runtime to support the application. The current activity-id specifies whether any activity of the application is currently designated to be logged, and when some activity is currently designated the current activity-id also specifies which activity is currently designated.

Some embodiments automatically add a child activity to the set of log-enabled activities, when the child activity is a child of a parent activity which is in the set of log-enabled activities. The child activity is added in response to receiving an indication, while the parent activity is in the set of log-enabled activities, that the child activity is a child of the parent activity. Some embodiments log the creation of any child activity by a parent activity which is in the set of log-enabled activities.

By way of further illustration, consider a situation in which an embodiment associates a thread-id denoted here as Thread1 with an activity-id denoted here as Activity1, and then receives in the logger an indication of a log-event procedure invocation by Thread1. Assume the indication specifies an event denoted here as Event1. Some embodiments avoid logging Event1 because Activity1 is not in the set of log-enabled activities. Now assume the indication specifies an event denoted here as Event2. Some embodiments log Event2 even though Activity1 is not in the set of log-enabled activities because Event2 is a start-event, and also add Activity1 to the set of log-enabled activities because Event2 is a start-event. Now assume the indication specifies an event denoted here as Event3. Some embodiments avoid logging Event3 even though Event3 is a start-event, because the sampling frequency for Event3 is one log entry per N log-event procedure invocations and the invocation of the log-event procedure is not an Nth logging attempt for Event3.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
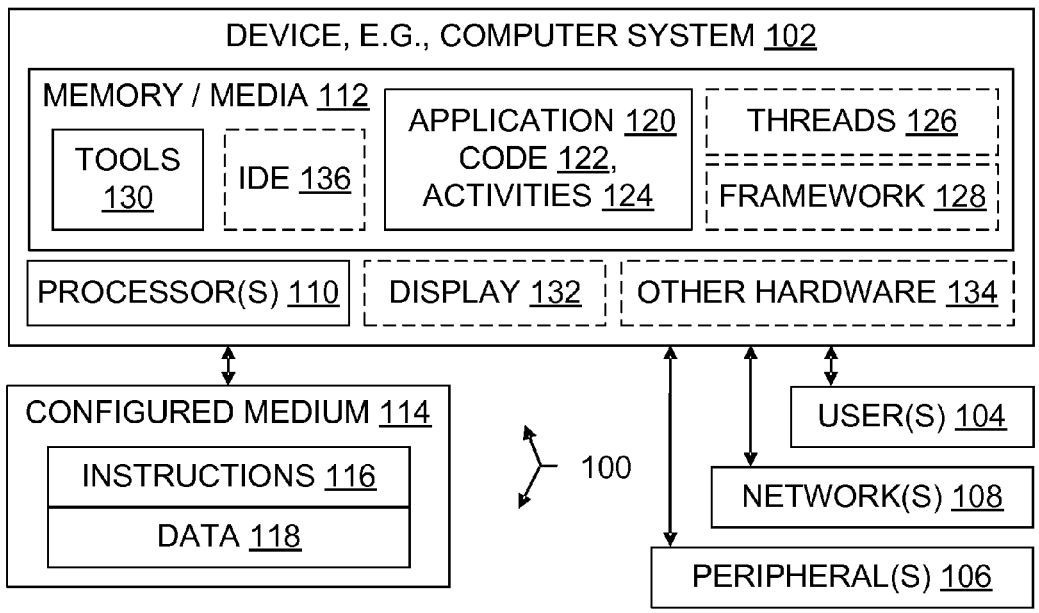
FIG. 1 is a block diagram illustrating a computer system having at least one processor and at least one memory which interact with one another under the control of software for activity-based sampling of diagnostic data, and other items in an operating environment which may be present on multiple network nodes, and also illustrating configured storage medium (as opposed to a mere signal) embodiments.

Sampling of diagnostics data can be used to reduce the disk, processor, and memory overhead of logging information. When correlated, diagnostics information can provide actionable information, but familiar sampling techniques such as random or periodic sampling result in important contextual data being dropped.

Some familiar approaches to program analysis add instrumentation to a user's application and framework, hooking the entry points of components of the application, such as the code that handles incoming and outgoing HTTP transfer from a web service (one of skill will recognize that HTTP stands for Hypertext Transfer Protocol). Some approaches add more instrumentation to particular places in the application, when problem spots and/or hot paths are detected in the application. They can then either use heuristics to correlate the set of data together, or use an identifier for the thread where the instrumentation points were hit. However, such approaches are often inaccurate, and rely on multiple passes of the same type of activity to collect diagnostics information. They may also not work with code that hops threads, such as the async/await patterns introduced with the Microsoft® .NET™ 4.5 framework (marks of Microsoft Corporation).

With activity-based sampling, however, activities are defined which represent units of execution on the machine. Activities are related to each other with parent-child relationships. Once sampling begins on a parent activity it will continue on all child activities. Diagnostics data can be then configured to only be logged for a sampled activity. Diagnostics data can be logged for a flow of execution, allowing high fidelity and the collection of contextual information, while reducing total overhead by starting the activity sampling only on specified occasions. Activity-based sampling can reduce overhead of logging while still providing useful and relevantly focused diagnostics data. It is possible in some environments to get focused diagnostics data with post-analysis of the data stream, but sampling allows one to throw out unwanted data at runtime, thereby reducing the overhead of logging.

Some embodiments described herein may be viewed in a broader context. For instance, concepts such as activities, events, logging, sampling frequency, and threads may be relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems. Other media, systems, and methods involving activities, events, logging, sampling frequency, and/or threads are outside the present scope. Accordingly, vagueness, mere abstractness, lack of technical character, and accompanying proof problems are also avoided under a proper understanding of the present disclosure.

The technical character of embodiments described herein will be apparent to one of ordinary skill in the art, and will also be apparent in several ways to a wide range of attentive readers. First, some embodiments address technical problems such as selectively logging useful diagnostic data and correlating different pieces of diagnostic data such as events and activities. Second, some embodiments include technical components such as computing hardware which interacts with software in a manner beyond the typical interactions within a general purpose computer. For example, in addition to normal interaction such as memory allocation in general, memory reads and write in general, instruction execution in general, and some sort of I/O, some embodiments described herein associate start-events with sampling frequencies, log activity creations, and define loggable events. Third, technical effects provided by some embodiments include log-event procedure invocations in applications, and activity-based diagnostic logs. Fourth, some embodiments include technical adaptations such as loggable event definitions, log-event procedures, set-activity-id procedure(s), and a set of log-enabled activities. Fifth, some embodiments modify the technical functionality of diagnostic logging by activity-based sampling based on technical considerations such as sampling frequency conditions and activity parent-child relations. Sixth, technical advantages of some embodiments include the exclusion of irrelevant diagnostic data from logs, automatic logging of child activities even when child and parent activities execute on different threads, and simplified development through more usable diagnostics logging.

Reference will now be made to exemplary embodiments such as those illustrated in the drawings, and specific language will be used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, smartphones, cell or mobile phones, other mobile devices having at least a processor and a memory, and/or other device(s) providing one or more processors controlled at least in part by instructions. The instructions may be in the form of firmware or other software in memory and/or specialized circuitry. In particular, although it may occur that many embodiments run on workstation or laptop computers, other embodiments may run on other computing devices, and any one or more such devices may be part of a given embodiment.

A "multithreaded" computer system is a computer system which supports multiple execution threads. The term "thread" is to be understood to include any code capable of or subject to scheduling (and possibly to synchronization), and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit, such as a core in a simultaneous multithreading implementation. As another example, a hyperthreaded quad core chip running two threads per core has eight logical processors. A logical processor includes hardware. The term "logical" is used to prevent a mistaken conclusion that a given chip has at most one processor; "logical processor" and "processor" are used interchangeably herein. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, virtual machines, BIOS code, and similar hardware interface software.

"Code" means processor instructions, data (which includes constants, variables, and data structures), or both instructions and data.

"Program" is used broadly herein, to include applications, kernels, drivers, interrupt handlers, libraries, and other code written by programmers (who are also referred to as developers).

As used herein, "include" allows additional elements (i.e., includes means comprises) unless otherwise stated. "Consists of" means consists essentially of, or consists entirely of. X consists essentially of Y when the non-Y part of X, if any, can be freely altered, removed, and/or added without altering the functionality of claimed embodiments so far as a claim in question is concerned.

"Process" is sometimes used herein as a term of the computing science arts, and in that technical sense encompasses resource users, namely, coroutines, threads, tasks, interrupt handlers, application processes, kernel processes, procedures, and object methods, for example. "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment. For example, certain familiar devices perform balance calculations to maintain their balance; some examples include mobile robots and SEGWAY® wheeled personal mobility devices (mark of Segway, Inc.). These devices are not part of the embodiments described herein but they illustrate the point that technical effects are provided by technical components, not by mere mental steps. Balance calculations simply cannot be performed rapidly enough by mental steps or by paper and pencil to provide the balance that is present in many mobile robots or wheeled personal mobility devices. The technical effect of having a dynamically balanced device is thus provided by technical components which include a processor and a memory interacting with balance control software.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

Throughout this document, use of the optional plural "(s)", "(es)", or "(ies)" means that one or more of the indicated feature is present. For example, "processor(s)" means "one or more processors" or equivalently "at least one processor".

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as adding, associating, avoiding, checking, configuring, defining, designating, determining, documenting, executing, having, identifying, including, interacting, invoking, logging, notifying, noting, performing, providing, putting, receiving, removing, representing, retrieving, sampling, satisfying, seeing, sending, setting, specifying, starting, stopping (and adds, added, associates, associated, etc.) with regard to a destination or other subject may involve intervening action such as forwarding, copying, uploading, downloading, encoding, decoding, compressing, decompressing, encrypting, decrypting, authenticating, invoking, and so on by some other party, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. Unless expressly stated otherwise in a claim, a claim does not cover a signal per se. A memory or other computer-readable storage medium is not a propagating signal or a carrier wave outside the scope of patentable subject matter under United States Patent and Trademark Office (USPTO) interpretation of the In re Nuijten case.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise, "computer readable medium" means a computer readable storage medium, not a propagating signal per se.

Operating Environments

With reference to FIG. 1, an operating environment 100 for an embodiment may include a computer system 102. The computer system 102 may be a multiprocessor computer system, or not. An operating environment may include one or more machines in a given computer system, which may be clustered, client-server networked, and/or peer-to-peer networked. An individual machine is a computer system, and a group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A user interface may support interaction between an embodiment and one or more human users. A user interface may include a command line interface, a graphical user interface (GUI), natural user interface (NUI), voice command interface, and/or other interface presentations. A user interface may be generated on a local desktop computer, or on a smart phone, for example, or it may be generated from a web server and sent to a client. The user interface may be generated as part of a service and it may be integrated with other services, such as social networking services. A given operating environment includes devices and infrastructure which support these different user interface generation options and uses.

Natural user interface (NUI) operation may use speech recognition, touch and stylus recognition, gesture recognition both on screen and adjacent to the screen, air gestures, head and eye tracking, voice and speech, vision, touch, gestures, and/or machine intelligence, for example. Some examples of NUI technologies include touch sensitive displays, voice and speech recognition, intention and goal understanding, motion gesture detection using depth cameras (such as stereoscopic camera systems, infrared camera systems, RGB camera systems and combinations of these), motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (electroencephalograph and related tools).

One of skill will appreciate that the foregoing aspects and other aspects presented herein under "Operating Environments" may also form part of a given embodiment. This document's headings are not intended to provide a strict classification of features into embodiment and non-embodiment feature classes.

As another example, a game may be resident on a Microsoft XBOX Live® server (mark of Microsoft Corporation). The game may be purchased from a console and it may be executed in whole or in part on the server, on the console, or both. Multiple users may interact with the game using standard controllers, air gestures, voice, or using a companion device such as a smartphone or a tablet. A given operating environment includes devices and infrastructure which support these different use scenarios.

System administrators, developers, engineers, and end-users are each a particular type of user 104. Automated agents, scripts, playback software, and the like acting on behalf of one or more people may also be users 104. Storage devices and/or networking devices may be considered peripheral equipment in some embodiments. Other computer systems not shown in FIG. 1 may interact in technological ways with the computer system 102 or with another system embodiment using one or more connections to a network 108 via network interface equipment, for example.

The computer system 102 includes at least one logical processor 110. The computer system 102, like other suitable systems, also includes one or more computer-readable storage media 112. Media 112 may be of different physical types. The media 112 may be volatile memory, non-volatile memory, fixed in place media, removable media, magnetic media, optical media, and/or of other types of physical durable storage media (none of which are a propagated signal). In particular, a configured medium 114 such as a CD, DVD, memory stick, or other removable non-volatile memory medium may become functionally a technological part of the computer system when inserted or otherwise installed, making its content accessible for interaction with and use by processor 110. The removable configured medium 114 is an example of a computer-readable storage medium 112. Some other examples of computer-readable storage media 112 include built-in RAM, ROM, hard disks, and other memory storage devices which are not readily removable by users 104. Neither a computer-readable medium nor a computer-readable memory includes a signal per se.

The medium 114 is configured with instructions 116 that are executable by a processor 110; "executable" is used in a broad sense herein to include machine code, interpretable code, bytecode, and/or code that runs on a virtual machine, for example. The medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, cell phone, or gaming console), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In the illustrated environments 100, one or more applications 120 have code 122 which performs activities 124 designated in the code by a developer. In some cases, application code 122 is organized in threads 126, and in some cases, the application code 122 is supported by a framework 128, such as a collection of coordinated standard libraries in a runtime. Software development tools 130 such as compilers, debuggers, profilers, and performance monitors assist with software development by producing and/or transforming code 122. The code 122, tools 130, and other items shown in the Figures and/or discussed in the text, may each reside partially or entirely within one or more hardware media 112, thereby configuring those media for technical effects which go beyond the "normal" (i.e., least common denominator) interactions inherent in all hardware—software cooperative operation.

In addition to processors 110 (CPUs, ALUs, FPUs, and/or GPUs), memory/storage media 112, and display(s) 132, an operating environment may also include other hardware 134, such as battery(ies), buses, power supplies, wired and wireless network interface cards, and accelerators, for instance, whose respective operations are described herein to the extent not already apparent to one of skill. CPUs are central processing units, ALUs are arithmetic and logic units, FPUs are floating point processing units, and GPUs are graphical processing units.

A given operating environment 100 may include an Integrated Development Environment (IDE) 136 which provides a developer with a set of coordinated software development tools 130 such as compilers, source code editors, profilers, debuggers, and so on. In particular, some of the suitable operating environments for some embodiments include or help create a Microsoft® Visual Studio® development environment (marks of Microsoft Corporation) configured to support program development. Some suitable operating environments include Java® environments (mark of Oracle America, Inc.), and some include environments which utilize languages such as C++ or C# ("C-Sharp"), but teachings herein are applicable with a wide variety of programming languages, programming models, and programs, as well as with technical endeavors outside the field of software development per se.

One or more items are shown in outline form in FIG. 1 to emphasize that they are not necessarily part of the illustrated operating environment, but may interoperate with items in the operating environment as discussed herein. It does not follow that items not in outline form are necessarily required, in any Figure or any embodiment.

Systems

Figure 2:
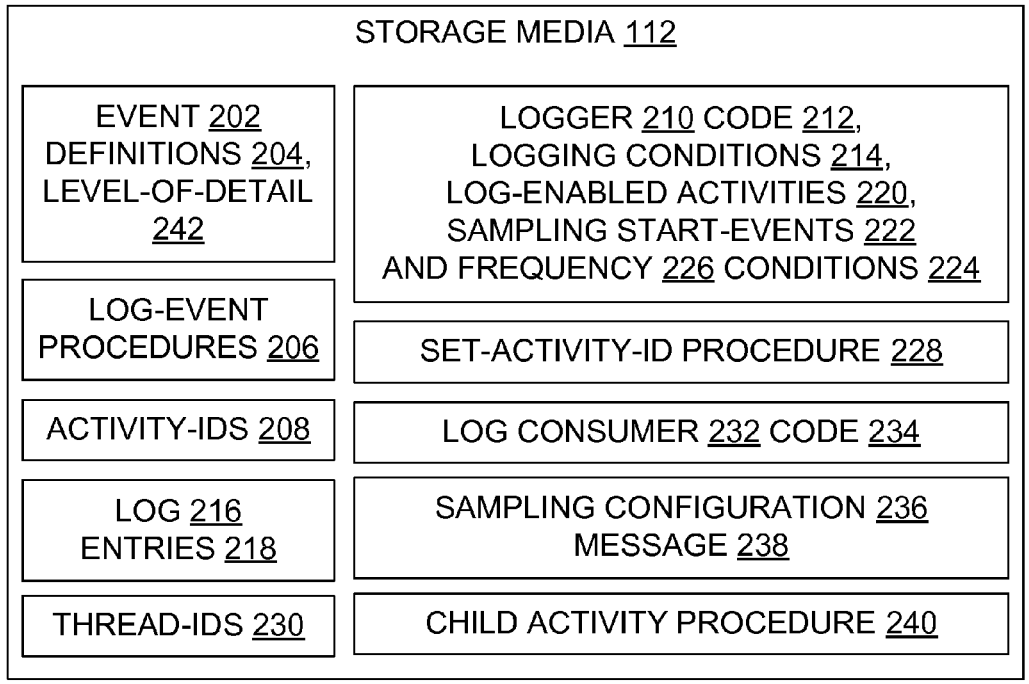
FIG. 2 is a block diagram illustrating aspects of activity-based sampling of diagnostic data, in an example architecture.

FIG. 2 illustrates aspects of an architecture which is suitable for use with some embodiments. Some embodiments provide activity-based sampling of diagnostic data using a memory 112 in operable communication with one or more processors 110. A set of event definitions 204 residing in the memory defines events 202 that a developer believes may shed light on the behavior of an application program. The application 120 also resides in the memory, and has application code 122 which is configured to invoke at least one log-event procedure 206. A current activity-id 208 specifies whether an activity 124 of the application is currently designated by or on behalf of the developer. When some activity 124 is currently designated, the current activity-id also specifies which activity is currently designated.

In some embodiments, a logger 210 residing in the memory 112 has logger code 212 which is configured to interact with the processor and memory to check 314 a set of specified 312 logging conditions 214 and send 320 a log entry 218 to a log 216 in response to invocation of a log-event procedure 206 when at least one specified logging condition is satisfied. The logger 210 includes a set of log-enabled activities 220, and also includes a set of one or more start-events 222, 202 with respective sampling frequency conditions 224. Each start-event 222 is an event 202 which is defined in the set of event definitions 204, although it is not necessarily defined there as a start-event because that role may be configured in the logger itself.

In some embodiments, the specified logging conditions 214 include a first condition specifying that the current activity-id 208 is present in the set of log-enabled activities 220. In some, the specified 312 logging conditions 214 also include a second condition specifying that the current activity-id 208 is absent from the set of log-enabled activities 220, that the log-event procedure 206 identifies 304 a start-event 222, and that the invocation of the log-event procedure 206 is consistent with the sampling frequency condition 224 of the start-event.

In some embodiments, a start-event sampling frequency condition 224 specifies that the invocation of the log-event procedure 206 be an Nth logging attempt for a start-event 222 which has a sampling frequency 226 of one log entry per N log-event procedure invocations. In these and/or other embodiments, a start-event sampling frequency condition 224 specifies that there have been less than M start events within a specified period of time.

Some embodiments include at least one set-activity-id procedure 228 invocation which is configured to set the current activity-id 208. The set-activity-id procedure invocation(s) reside in at least one of the following: the application code 122, a framework 128 which includes a runtime to support the application code. In particular, the application 120 may be a C++ application, and the framework 128 may include familiar standard C++ libraries.

In some embodiments, the application is a multi-threaded application 120. In some, the embodiment includes a current thread-id 230 which identifies a currently executing thread 126 of the application 120 during execution of the application. In some, at least one log entry 218 contains the current thread-id 230 ("current" meaning current as of creation of the log entry). In other embodiments, the application is not multi-threaded; activity-based sampling can also be useful, for example, to analyze a single-threaded application which uses a dispatch loop to interleave execution.

Some embodiments include a set of thread-ids 230 with corresponding activity-ids 208. The logger code 212 is configured to retrieve the current activity-id by looking up 328 the current thread-id in the set of thread-ids to find the corresponding activity-id and then use it as the current activity-id.

Some embodiments include a performance monitor or another log consumer 232, which may be in the application or outside it. The log consumer's code 234 is configured to send a sampling configuration 236 message 238 to the logger 210 to specify at least one event 202 as a start-event 222 and to specify the sampling frequency condition 224 for that start-event 222. The event definition 204 and/or the sampling configuration 236 also specifies a level-of-detail 242 for the event, in some embodiments. The sampling configuration 236 may be specified in other ways rather than by a message 238, in these and/or other embodiments, such as by configuration files, parameters controlled though a user interface, or otherwise familiar inter-process communication mechanisms adapted to specify 316 a sampling configuration 236 (namely, start-events and their sampling conditions).

Some embodiments include a child-activity procedure 240 invocation which is configured to notify 334 the logger 210 that a current activity 124 is creating a child activity 124. In some embodiments, the logger code 212 is configured to add the child activity to the set of log-enabled activities 220 in response to the child-activity procedure invocation. In some, a log entry 218 documents that the child-activity was created by another activity, namely, by the current activity at the time of child-activity procedure 240 invocation.

With reference to FIGS. 1 and 2, some embodiments provide a computer system 102 with a logical processor 110 and a memory medium 112 configured by circuitry, firmware, and/or software to provide technical effects such as activity-based sampling logs directed at technical problems such as filtering diagnostic data logging opportunities, by extending functionality with a logger 210 and logging conditions 214 as described herein.

In some embodiments peripherals 106 such as human user I/O devices (screen, keyboard, mouse, tablet, microphone, speaker, motion sensor, etc.) will be present in operable communication with one or more processors 110 and memory. However, an embodiment may also be deeply embedded in a technical system, such that no human user 104 interacts directly with the embodiment. Software processes may be users 104.

In some embodiments, the system includes multiple computers connected by a network. Networking interface equipment can provide access to networks 108, using components such as a packet-switched network interface card, a wireless transceiver, or a telephone network interface, for example, which may be present in a given computer system. However, an embodiment may also communicate technical data and/or technical instructions through direct memory access, removable nonvolatile media, or other information storage-retrieval and/or transmission approaches, or an embodiment in a computer system may operate without communicating with other computer systems.

Some embodiments operate in a "cloud" computing environment and/or a "cloud" storage environment in which computing services are not owned but are provided on demand. For example, application code 122 may be on multiple devices/systems 102 in a networked cloud, logs 216 may be stored on yet other devices within the cloud, and the log consumer 232 may configure the display on yet other cloud device(s)/system(s) 102.

Processes

Figure 3:
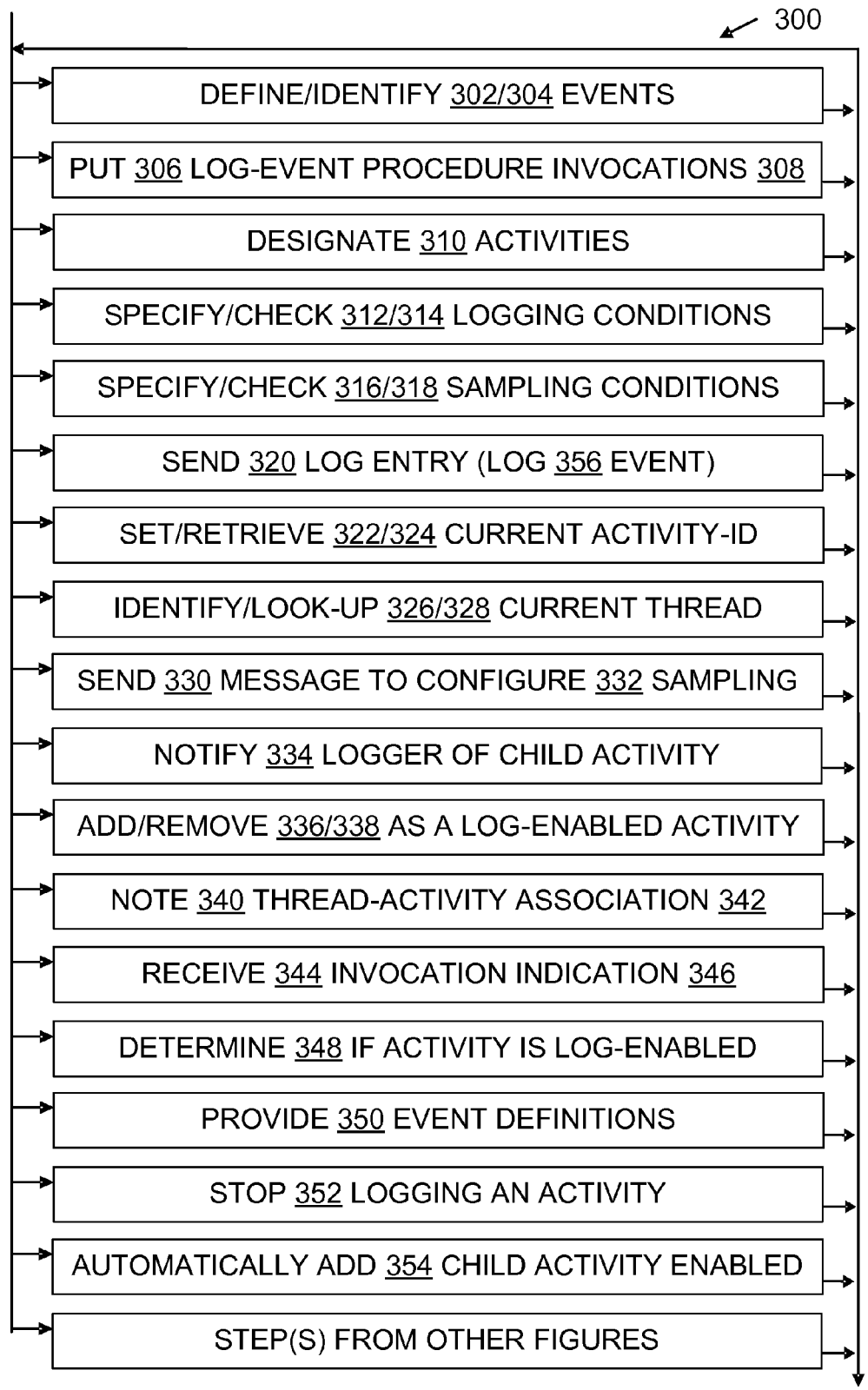
FIG. 3 is a flow chart illustrating steps of some process and configured storage medium embodiments.

FIG. 3 illustrates some process embodiments in a flowchart 300. Other process steps are also shown in FIGS. 4 through 9. Technical processes shown in the Figures or otherwise disclosed may be performed in some embodiments automatically, e.g., by logger 210 under control of a script or otherwise requiring little or no contemporaneous live user input. Processes may also be performed in part automatically and in part manually unless otherwise indicated. In a given embodiment zero or more illustrated steps of a process may be repeated, perhaps with different parameters or data to operate on. Steps in an embodiment may also be done in a different order than the top-to-bottom order that is laid out in FIG. 3. Steps may be performed serially, in a partially overlapping manner, or fully in parallel. The order in which flowchart 300 is traversed to indicate the steps performed during a process may vary from one performance of the process to another performance of the process. The flowchart traversal order may also vary from one process embodiment to another process embodiment. Steps may also be omitted, combined, renamed, regrouped, or otherwise depart from the illustrated flow, provided that the process performed is operable and conforms to at least one claim.

Examples are provided herein to help illustrate aspects of the technology, but the examples given within this document do not describe all possible embodiments. Embodiments are not limited to the specific implementations, arrangements, displays, features, approaches, or scenarios provided herein. A given embodiment may include additional or different technical features, mechanisms, and/or data structures, for instance, and may otherwise depart from the examples provided herein.

Some embodiments perform a technical process for activity-based sampling of diagnostic data using a logger 210. Some embodiments configure 332 the logger with data 118 which represents a set of log-enabled activities 220 and with data 404, 118 which represents a set of start-events 222 with respective sampling frequency conditions 224. In some, data 406, 118 in the logger 210 associates 342 a thread-id with an activity-id, the thread-id identifying 326 a thread of the computing system, and the activity-id identifying an activity which is performed at least in part by the identified associated thread. Some receive 344 in the logger an indication 346 of a log-event procedure invocation by an invoking thread, the indication specifying an event. Some determine 348 whether any activity represented in the set of log-enabled activities is currently an activity of the invoking thread. If any activity represented in the set of log-enabled activities is currently an activity of the invoking thread, then the event is logged 356 in a diagnostic data log 216. If no activity represented in the set of log-enabled activities is currently an activity of the invoking thread but the event is a start-event and the invocation of the log-event procedure satisfies the sampling frequency condition for the start-event, then the event is logged in the diagnostic data log and the activity of the invoking thread is added 336 to the set of log-enabled activities.

Some embodiments provide 350 a set of event definitions which define events. Specifically, the event definitions are provided to at least one of the following: an application 120, the logger 210, a log consumer 232. In some embodiments, the event definitions specify a level-of-detail for at least one of the events.

Some embodiments stop 352 the logging for a particular activity, even when log space or other resources are available and the application program is executing 358 activities. Some stop 352 logging in response to at least one of the following: seeing a stop-logging event 202, seeing a start-event 222 on a log-enabled activity again after previously seeing that start-event has triggered logging for the activity.

Some embodiments set 322 a current activity-id in response to a set-activity-id procedure 228 invocation. Some do so in at least one of the following: an application 120 in the computing system 102, a framework 128 which includes a runtime to support the application. The current activity-id specifies whether any activity of the application is currently designated 310 to be logged, and when some activity is currently designated the current activity-id also specifies which activity is currently designated.

Some embodiments automatically add 354, 336 a child activity to the set of log-enabled activities 220, when the child activity is a child of a parent activity which is in the set of log-enabled activities. The child activity is added 354 in response to receiving an indication, while the parent activity is in the set of log-enabled activities, that the child activity is a child of the parent activity. Some embodiments log the creation of any child activity by a parent activity which is in the set of log-enabled activities.

By way of further illustration, consider a situation in which an embodiment associates 342 a thread-id denoted here as Thread1 with an activity-id denoted here as Activity1, and then receives 344 in the logger an indication 346 of a log-event procedure invocation by Thread1. Assume the indication 346 specifies an event denoted here as Event1. Some embodiments avoid logging Event1 because Activity1 is not in the set of log-enabled activities. Now assume the indication specifies an event denoted here as Event2. Some embodiments log Event2 even though Activity1 is not in the set of log-enabled activities because Event2 is a start-event, and also add 336 Activity1 to the set of log-enabled activities because Event2 is a start-event. Now assume the indication specifies an event denoted here as Event3. Some embodiments avoid logging Event3 even though Event3 is a start-event, because the sampling frequency for Event3 is one log entry per N log-event procedure invocations and the invocation of the log-event procedure is not an Nth logging attempt for Event3.

Some embodiments operate as illustrated by the following example, which is referred to hereafter for convenience as the "WebRequestStart Example." For greater legibility, reference numerals are not used in this example, but capitalized item names in the example refer to items in the Figures which have similar or identical item names, e.g., LOG-CONSUMER refers to a log consumer 232, LOG-EVENT invocations refer to log-event procedure 206 invocations, and so forth.

Configuration: The LOG-CONSUMER adds <Event=WebRequestStart, Sampling Frequency=1 out of every 5> to the list of start events.

Thread1: SetCurrentThreadActivityId(A1)→record in internal data structure "Thread1, A1".

Thread1: LOG-EVENT(Event=SomeEvent)→Event is not logged (because A1 is not enabled)

Thread1: LOG-EVENT(Event=WebRequestStart)→Event is logged and A1 is added to LOG-ENABLED ACTIVITIES list. (A1 was not enabled, but WebRequestStart is a start event)

Thread1: LOG-EVENT(Event=SomeEvent)→Event is logged (because A1 is enabled)

Thread1: LOG-EVENT(Event=ChildActivityCreated, ChildActivity=A2)→Event is logged, A2 added to LOG-ENABLED ACTIVITIES list. (because A1 is enabled)

Thread1: SetCurrentThreadActivity(0)→A1 is removed from LOG-ENABLED ACTIVITIES, record in internal data structure "Thread1, 0"

Thread2: SetCurrentThreadActivity(A2)→record in internal data structure "Thread2, A2"

Thread2: LOG-EVENT(Event=SomeEvent)→Event is logged (because A2 is enabled)

Thread2: SetCurrentThreadActivity(0)→A2 is removed from LOG-ENABLED ACTIVITIES, record in internal data structure "Thread2, 0"

Thread1: SetCurrentThreadActivityId(A3)→record in internal data structure "Thread1, A3".

Thread1: LOG-EVENT(Event=SomeEvent)→Event is not logged (because A3 is not enabled)

Thread1: LOG-EVENT(Event=WebRequestStart)→Event is not logged (A3 was not enabled, WebRequestStart is a start event but it already fired once. After three more attempts to log WebRequestStart (not including this one), it will fire again because it meets the sampling criterion (1 out of every 5 events will fire and start sampling)).

Thread1: LOG-EVENT(Event=SomeEvent)→Event is not logged (because A3 is not enabled)

Figure 4:
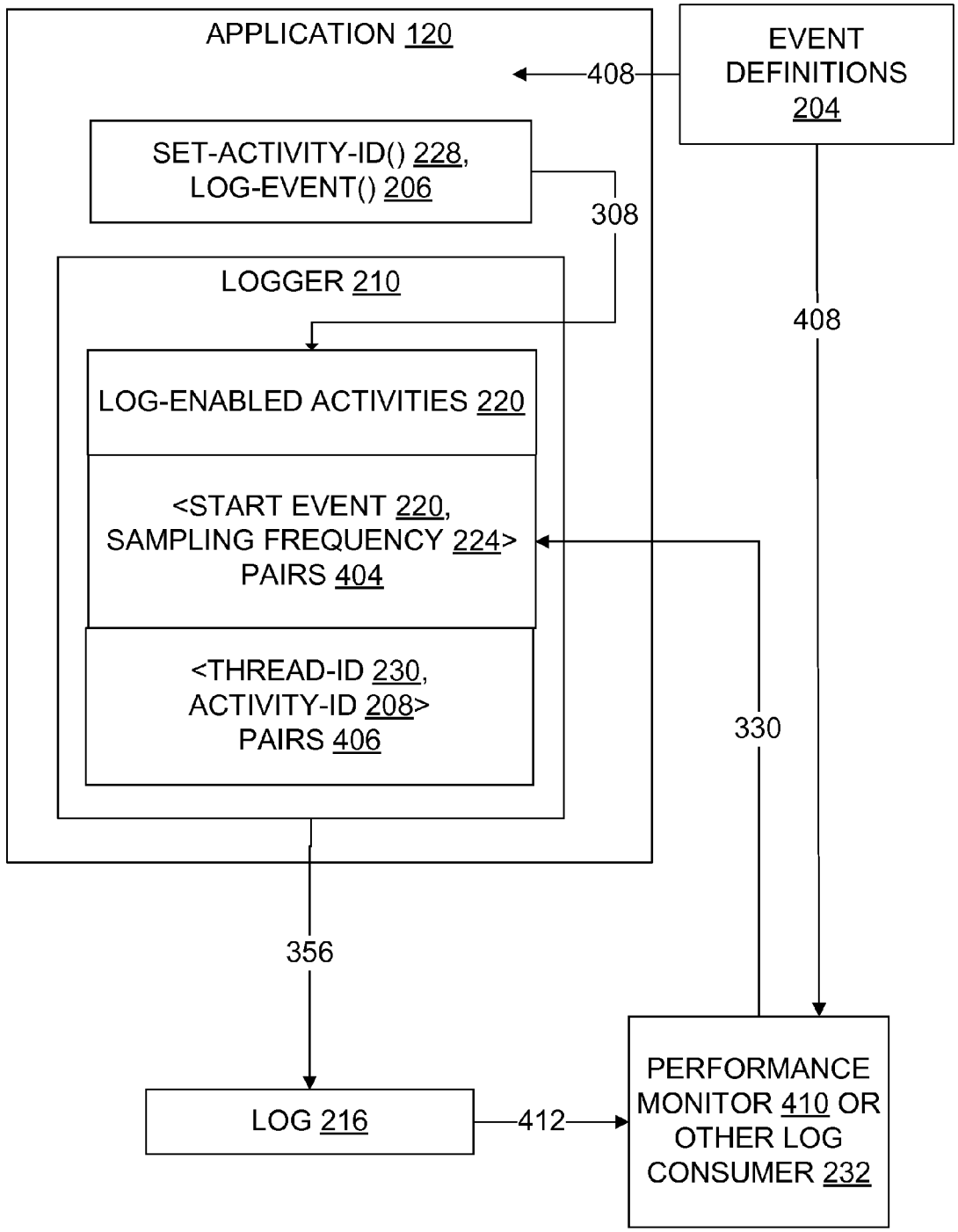
FIG. 4 is a data flow diagram illustrating aspects of activity-based sampling of diagnostic data, in another example architecture.

With particular attention now to FIG. 4, and continued attention to FIGS. 1 through 3, in some embodiments a developer 104 defines 302 events to be logged 356, namely event definitions 204. At least one event definition 204 can be configured 332 as a start-event 222 (e.g., WebRequestStart in the WebRequestStart Example above). The event definitions 204 can be located in the application 120, or be located elsewhere and imported 408 by the application. The event definitions 204 are also visible to the log consumer 232, and may be visible to the logger 210 or other system components. An event definition may include level-of-detail for the event, e.g., Informational or Verbose. In some embodiments, the log consumer can configure 332 any event to act as a sampling start-event 222. The developer may also define 302 events with the intention that they be logged as indications of progress within an activity. To trigger events 202 during application 120 execution, the developer also puts 306 log-event procedure invocations 308 in the application code 122.

In some embodiments, developers also define 302 loggable stop-events. If the application 120 stops logging for an activity, that activity is removed from the set of log-enabled activities 220. In some embodiments, heuristics are used by the application and/or logger to determine when logging 356 for an activity stops. One such heuristic is to stop logging upon seeing a start event on a log-enabled activity, if that start event was the same event that triggered logging to begin. These heuristics vary as needed to get the desired sampled set of events written to the log 216. In some embodiments there are no explicit stop events. In some embodiments, logging stops only when the application stops or when the log reaches the maximum permitted size or the system hits some other resource constraint.

The start-events, stop-events, and milestone-events reflect the developer's view of semantics of the application. For example, WebRequestStart and DatabaseCallStop are one developer's meaningful names for events that reflect the progress of an activity, in the example above. The logger 210 does not necessarily take any action based on those semantics, but instead simply logs events as instructed. From the perspective of the logger sampling technology, all milestone events are substantially the same as one another, and all start-events are substantially the same as one another.

In some embodiments, there are no loggable events to associate 342 a thread 126 with an activity 124, but there is at least one procedure 228 to create that association within a logger 210, e.g., a SetCurrentThreadActivityID( ) procedure. The logging system has a mechanism (e.g., a list or table of <thread-id, activity-id>pairs) for recording which threads are working on what activities, and the information is surfaced to the log consumer 232 by including the activity-id in each event that is logged. The thread-id can be passed as a SetCurrentThreadActivityID( ) parameter in some embodiments, while in other embodiments the logger obtains the current thread's ID from a kernel thread scheduler or by inspecting the thread on which the function was called. The activity-id is passed as a SetCurrentThreadActivityID( ) parameter. Of course, the name "SetCurrentThreadActivityID" is used here simply as an example; the same functionality can be provided by a procedure 228 having some other name.

In some embodiments, sampling is dynamically enabled or disabled at runtime a message from a performance monitor 410 or other log consumer 232. The log consumer 232 sends 330 a message to configure a set of one or more start-events, each with a sampling frequency 224 for how often sampling will be started when that event is seen. For example, to sample 1 out of every 100 web service requests, one embodiment passes the argument arguments["ActivitySamplingStart- Events"]="WebRequestStart:100". Then, every 100 times the WebRequestEvent method was called, it would log the event and then start sampling for the remainder of that activity and every child activity created after. In some embodiments, one may also have more than one start event. For example, to capture logs for URLs which have been observed to result in poor performance, one could fire a "ProblematicUrlObserved" event and have it start sampling every time it is called: arguments["ActivitySamplingStartEvents"]="RequestStart: 100 ProblematicUrlObserved:1".

In some embodiments, a developer controls a performance monitor or other log consumer 232 (such as an EventListener or ETW session), which sends a message to a logger to configure 332 a set of one or more start-events. ETW stands for Event Tracing for Windows® (mark of Microsoft Corporation). Activity-based sampling provides better dynamic filtering capabilities for production monitoring solutions to achieve low overhead than the capability in familiar logging infrastructure such as ETW, where a set of data is either turned "on" or "off". Instrumentation based approaches used by application performance management solutions do not work with asynchronous code that hops threads frequently.

The message also includes a sampling frequency condition 224 for the start-event 222 stating when and/or how often sampling would be started after that start-event is seen. The sampling start event id is placed in a list of start-events in the logger. Although the performance monitor/log consumer sets the start event, sampling frequency pairs, it does not add anything to the log-enabled activities list. When the start-event is observed at runtime as the result of a log-event( ) call, and when the logger determines that the observed event meets the criteria for logging (e.g., the number of events skipped since the last successful logging of that event id satisfies the configured sampling frequency), the start-event is logged and the activity for the start-event is placed in a list of log-enabled activities.

Although the log consumer 232 is shown outside the application 120 in FIG. 4, in some embodiments the log consumer is inside the application. That is, an application may consume its own log. More generally, any or all of the components 204, 210, 216, 232 can reside inside or outside the application 120. For example, the application could be logging to an in-memory buffer, with the logger, log consumer, and log all inside the application. One configuration which may be popular has the logger inside the application, with the log and log consumer outside of the application, as shown in FIG. 4.

In some embodiments, any child activity of a log-enabled activity is automatically placed in the list of log-enabled-activities 220. In some embodiments, the existence of a child activity is recorded by including a child activity ID when logging an event, e.g., WriteEventWithRelatedActivity( ) logs an event and also identifies a new activity-id as a child activity of the current activity. As with other procedure names, WriteEventWithRelatedActivity( ) could be named differently, e.g., WriteEventWithChildActivity( ) or WriteEventWithActivityCausedByCurrentActivity( ) The identification of a child activity could also be factored out, e.g., in some embodiments ActivityCausedByCurrentActivity(new-activity-id) does not log any event but does add new-activity-id to the list of log-enabled-activities. In many embodiments, the parent→child relationship is logged, so that the log consumer knows the events for the parent and child activities are related. In some scenarios, one may sample child activities but not log the relationship.

In some embodiments, during execution of the application, set-activity-id( ) procedures 228 and log-event( ) procedures 206 get called. In some embodiments, these calls were put 306 in the code 122 by the developer. In some embodiments, set-activity-id and log-event can also be called by the platform (the framework 128). In some embodiments, developers will not have to call set-activity-id( ) because the enhanced Microsoft® .NET™ framework 128 will already call it in the right places (marks of Microsoft Corporation).

In some embodiments, SetCurrentThreadActivityID (thread-id, activity-id) and its differently factored variation SetCurrentThreadActivityID(activity-id) are examples of Set-activity-id( ) procedures. The set-activity-id( ) procedures 228 update the logger <thread-id, activity-id>pairs 406, but do not cause any entry in the log 216.

In some embodiments, all the other sampling procedures (WebRequestStart, DatabaseCallStop, . . . ) are examples of log-event( ) procedures 206. As such, they will cause an entry in the log, if the sampling frequency criterion is met, or the current thread's activity is in the list of log-enabled-activities. The exact content of the log entry depends on the event definition for the event whose log-event( ) procedure is being called.

MvpEventSource.Log.foo(thread-id, activity-id, some-other-event) is one example format for a log-event( ) procedure 206, but other formats will also be apparent to those of skill. In some embodiments, when log-event( ) is called the thread-id is obtained by checking the scheduler to determine the current thread id, and the thread id is used by the logger to look up the activity id for that thread. In some embodiments, when log-event( ) is called the logger looks for activity-id on the log-enabled activities list, and either finds it or doesn't. If it does find activity-id on the log-enabled activities list, then the event is logged. If it doesn't find activity-id on the log-enabled activities list, it checks 318 to see if this logging attempt is one that ought to start sampling based on the sampling frequency, e.g., this is the 100th attempt for an event with 1 log entry per 100 log-event( ) calls, and either makes a log entry and adds the current activity to the list of log-enabled activities or doesn't, accordingly. As noted above, the successful logging of a start-event will turn on activity sampling for the activity-id currently associated with thread-id, and any child-activity-id created from a thread-id with activity-id set.

In some embodiments, log entries are consumed 412 by the performance monitor or other log consumer 232, during or after execution of the application 120.

Configured Media

Some embodiments include a configured computer-readable storage medium 112. Medium 112 may include disks (magnetic, optical, or otherwise), RAM, EEPROMS or other ROMs, and/or other configurable memory, including in particular computer-readable media (as opposed to mere propagated signals). The storage medium which is configured may be in particular a removable storage medium 114 such as a CD, DVD, or flash memory. A general-purpose memory, which may be removable or not, and may be volatile or not, can be configured into an embodiment using items such as a set of log-enabled activities 220, one or more sampling start-events 222, sampling frequency conditions 224, set-activity-id procedures 228, sampling configuration messages 238, and other items shown in FIG. 3 or FIG. 4, in the form of data 118 and instructions 116, read from a removable medium 114 and/or another source such as a network connection, to form a configured medium. The configured medium 112 is capable of causing a computer system to perform technical process steps for activity-based sampling to provide diagnostic data as disclosed herein. The figures accompanying the present document's text thus help illustrate configured storage media embodiments and process embodiments, as well as system and process embodiments. In particular, any of the process steps illustrated in FIG. 3 and/or FIG. 4, or otherwise taught herein, may be used to help configure a storage medium to form a configured medium embodiment.

Additional Examples

Additional details and design considerations are provided below. As with the other examples herein, the features described may be used individually and/or in combination, or not at all, in a given embodiment.

Those of skill will understand that implementation details may pertain to specific code, such as specific APIs and specific sample programs, and thus need not appear in every embodiment. Those of skill will also understand that program identifiers such as procedure names and event names and some other terminology used in discussing details are implementation-specific and thus need not pertain to every embodiment. Nonetheless, although they are not necessarily required to be present here, these details are provided because they may help some readers by providing context and/or may illustrate a few of the many possible implementations of the technology discussed herein.

As another overview of activity-based sampling, in some embodiments, a sampling state follows the flow of execution of the machine, including when execution hops between threads. In some, activity sampling is implemented in a general purpose fashion and can be configured without modification to the application 120.

In some embodiments, an activity id is generated for every sequential unit of execution on a thread and recorded in a location accessible by code running on a given thread. A mechanism such as an event logged by the application triggers the beginning of sampling for a given activity id. Once sampling has begun, the embodiment adds the current activity id to a table which records the activities being sampled. A developer can configure an embodiment so that a desired set of diagnostics data will only be logged when an activity is being sampled. When this diagnostics data has the opportunity to be logged, the embodiment checks to see if its current activity is in the table of activities being sampled. If it is in the table then the data is logged, if it is not in the table then the embodiment does not log the data.

In some embodiments, if an activity causes another unit of execution to run later on the current thread or another thread, and the activity is being sampled at the time the unit of execution is scheduled, then the activity id of the other unit of execution is added to the table of active activities. An alternative is to generate a single activity id which can be re-used for the child activities, but this reduces the amount of information one can infer from the flow of execution, such as what diagnostics data can be grouped together as part of the flow of execution.

Figure 8:
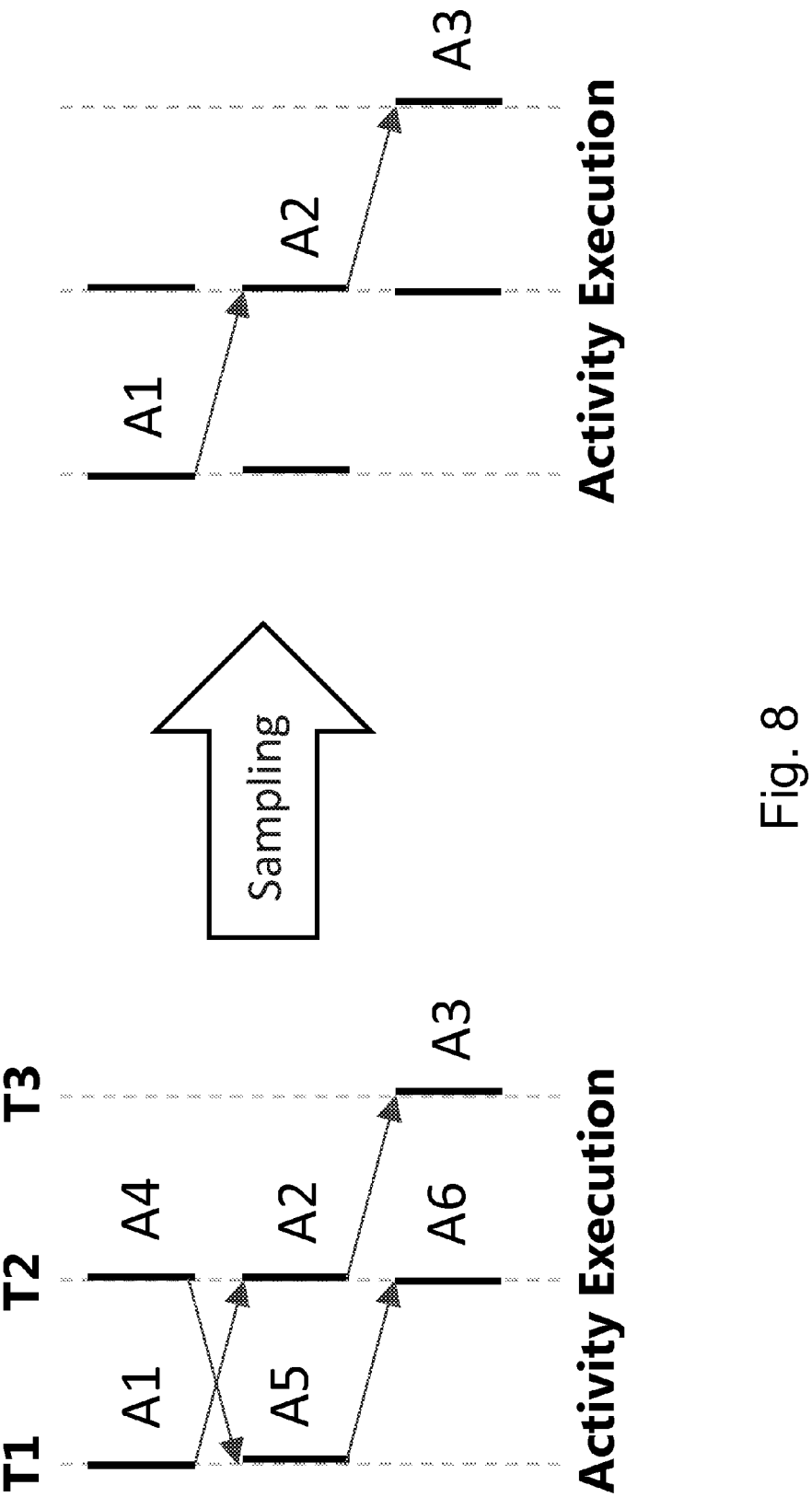
FIG. 8 is a diagram illustrating the positive impact of activity-based sampling as a mechanism for obtaining useful diagnostic data about software activities through exclusion of irrelevant data.

FIG. 8 illustrates a technical result and potential benefit of such activity-based sampling. Specifically, shows several activities A1 through A6 for three threads T1 through T3. One effect of activity-based sampling in this example is that the surfeit of diagnostics data generated by activities without sampling is reduced to a more relevant subset of diagnostics data for particular activities with sampling enforced.

Figure 5:
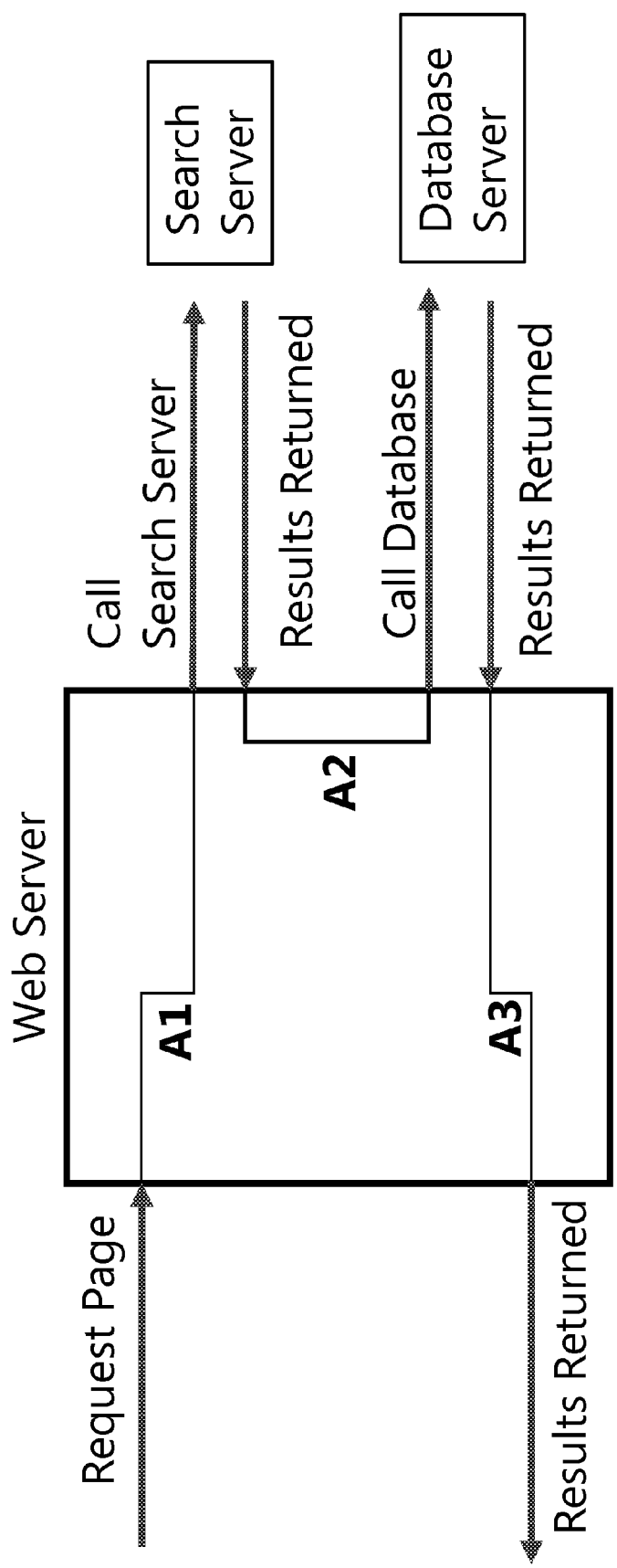
FIG. 5 is an architectural diagram illustrating activities in a web service request.
Figure 7:
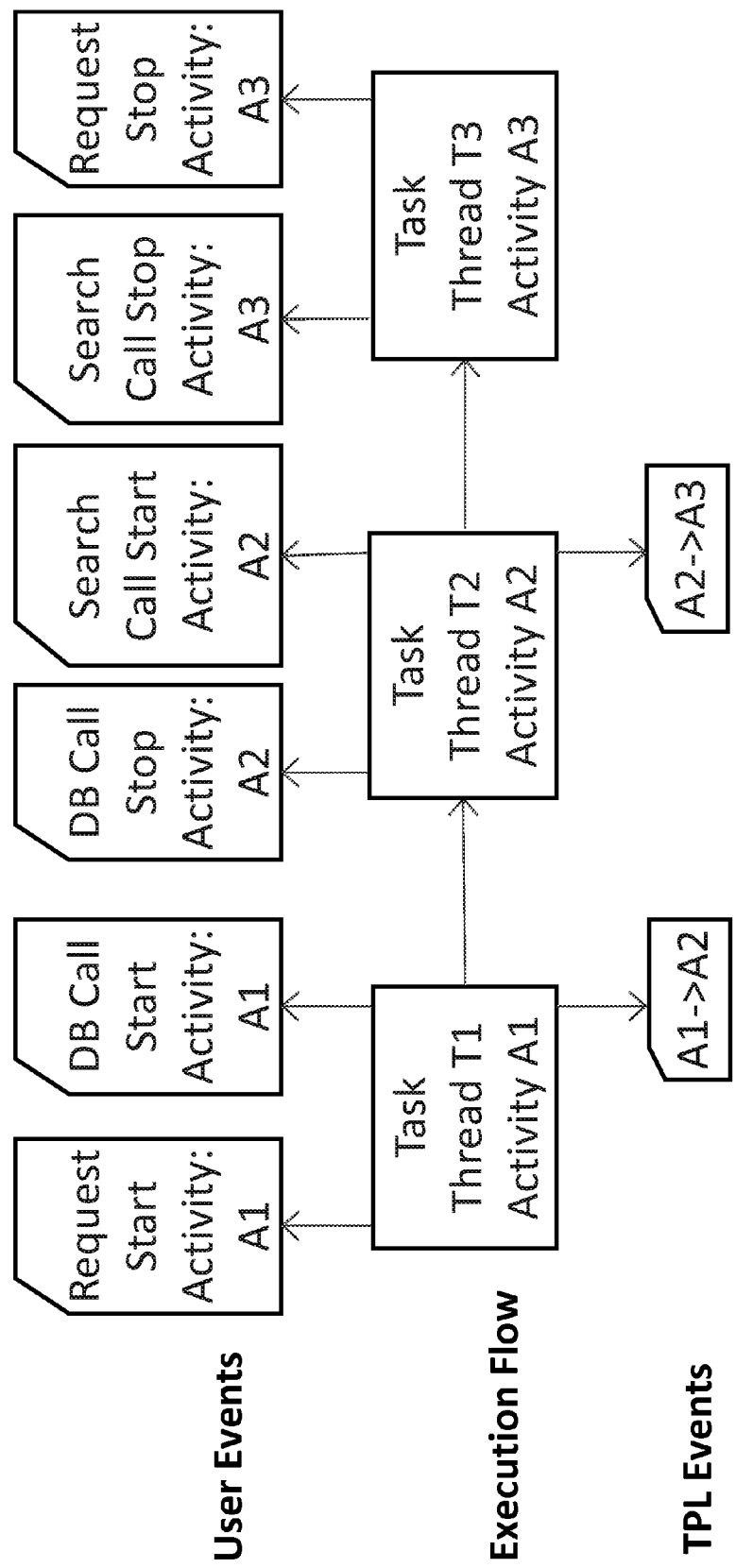
FIG. 7 is a diagram illustrating some connections between user-defined events, threads and activities of an execution flow, and activity-creating events in a Microsoft® Task Parallel Library (TPL) library (mark of Microsoft Corporation)

FIGS. 5 and 7 provide additional examples from different perspectives. FIG. 5 shows an example in which different activities run on different threads in a web server but form related parts of an overall web request flow. Some embodiments facilitate connection of such disparate activities by noting 340 in the log when one activity spawns another and/or by automatically adding 354 a spawned (a.k.a. child) activity to the list of log-enabled activities 220 when the parent activity is on that list. FIG. 7 shows information generated by a sampled flow of execution for another web request, and in particular illustrates noting 340 in the log when one activity spawns another.

With regard to defining activities 124 in some embodiments, consider first the following background. A performance context includes a unique identifier, the PID, and a subtask identifier, the STID. The Performance ID (PID) is unique for each new root task and is shared across the tree of tasks associated with a root task. The subtask ID (STID) is an ordered set of numbers that describes the location of each task in the tree of tasks. The leading number is usually a zero. A leading number of 1 indicates that it has not been possible to track the location of the sub-task within the overall sub-task tree. The following three scenarios illustrate how PID and STID are used when an HTTP request is sent from an HTTP server (as a reverse proxy) to an application services server and the HTTP server involves invocation of two remote web services from the application services server.

PID-STID Scenario One includes a root task on HTTP server, wherein:
new PID=1234, root STID=0.

PID-STID Scenario Two includes a single sub-task on an application services server on HTTP server, wherein: same PID=1234, sub-task STID=0:1.

PID-STID Scenario Three includes two sub-tasks, one on each web service, wherein: first web service invoked uses same PID=1234, sub-task STID=0:1:1, and second web service invoked uses same PID=1234, sub-task STID=0:1:2.

There is some overlap between the PID-STID approach and an approach for definition of activities in some embodiments, but the two approaches also differ in some ways. For example, in some embodiments all tasks (root tasks and sub tasks) are activities, but not all activities are root tasks or sub tasks (the definition of activities is more general). Similarly, the PID-STID tree of tasks (starting with a root task) can also be considered a single activity, but not all activities are trees of tasks. A PID is an activity ID because it can uniquely identify an (the tree of tasks) within the system, but not all activity IDs are PIDs. A STID on its own is not an activity ID, because it would be combined with the PID to uniquely identify a task (i.e. a task A can have PID=1234, STID=0:1, and task B can have PID=1235, STID=0:1). An activity ID is never an STID in these embodiments. A performance context is an activity ID, because the combination of PID and STID can uniquely identify an activity (a task) within the system. Not all activity IDs are performance contexts.

Thus, some embodiments have a more general mechanism for tracking execution than the PID-STID mechanism. To highlight some of the differences between the two mechanisms, one may express the PID-STID mechanism by restricting an embodiment's more general definition as follows. Every task is an activity, where an activity ID is composed of a PID and a STID (e.g. an activity ID is a performance context). Relationships between activities are described in a tree of parent→child relationships. For two tasks to have the same PID they are constrained to be part of the same tree of activities. The STID portion of the ID would encode the parent→child relationships between activities, where the relationships are an ordered set of numbers.

That is, these embodiments do not require that the activity ID encodes the relationships between activities, because relationships between activities can be recorded in a separate data structure (e.g., by logging an event containing the relationships between activities). Indeed, these embodiments may even be free of relationships between activities 124. Nor is there necessarily an ordered set of numbers as part of the activity ID. In these embodiments, an activity ID can be any set of data which can uniquely identify a single activity within the process at a given point in time. Although activities and activity IDs are familiar to those of skill, these embodiments leverage them through innovative tools and techniques to implement the dynamic enabling and disabling of logging (sampling) at runtime.

In some embodiments, an activity is defined as a grouping of units of execution in a system 102, where a unit of execution is the work a particular thread does between two points of time. A grouping can be arbitrary, but is typically formed to have logical or semantic meaning to the user or developer 104. The code executing on a thread is able to determine what activities it is currently associated with. For example, an activity can be all of the execution a web server does to respond to an http request.

Activities can optionally be related to other activities, where the relationships between activities are arbitrary and can be expressed at run time or after the fact. These relationships allow a group of activities to be formed. For example, one can have a tree of activities which represent all of the execution a web server does to respond to an http request. In this example the tree might express that all the activities are related through parent→child relationships, where the parent activity caused all of the execution in the child activity to occur.

Some embodiments build upon this definition to permit a more formal definition of the design of the sampling technique. For example, to allow a group of related activities to be sampled, some impose the following restriction on activities in the sampled group: If Activity A is related to Activity B, and execution of Activity A begins before execution of Activity B, then the relationship of "A is related to B" is to be expressed during program execution at a point in time when it is known that Activity A was part of the sampled group, and before any execution of activity B occurs. This is not necessarily a comprehensive definition; it may be relaxed to work with legacy code, for example.

Thread states such as new, ready, running, and blocked are a lower level (more detailed) concept than a sequential unit of execution on a thread. A thread can be changed from running to ready or blocked in the middle of executing a task, but may continue executing that task when it returns to the ready state, for example. A unit of execution is work to be completed on a thread before other work can begin. With asynchronous code a dispatcher will schedule a single thread to run many small units of unrelated work on behalf of other components in the system. Each unit will run to completion before another unit can be scheduled. It is up to the scheduling library when each unit starts and stops. In Microsoft® .NET™ 4.5 environments (marks of Microsoft Corporation) async/await these units are called tasks, but a third party library may implement their own thread scheduling and set activity IDs to match a definition herein.

The two points in time that define a unit of execution can be (a) the automatically determined starting point and ending point of an HTTP request, or (b) points in time which are explicitly specified during or after runtime by a user or developer, for example, in order to indicate a unit of execution that has logical or semantic meaning to the user or developer. In many if not all cases, the points in time are determined by the executing code (i.e., determined programmatically), either at development time or by dynamically generated code (in the case of a profiling agent injecting code at runtime). The executing code at a point in time will record in some data structure that a given thread is working on activity A, and at a later point in time will record that the thread is now working on either no activity or a different activity.

For example, if two requests come into a web service one after the other, the web framework might take the following actions:

t0 (At the start of request 1): "Thread 1 is working on A1"
t1 (At the end of request 1): "Thread 1 is working on no activity"
t2 (At the start of request 2): "Thread 1 is working on A2"
t3 (At the start of request 2): "Thread 1 is working on no activity"

A1 consists of the work Thread 1 is doing between t0 and t1, A2 consists of the work Thread 2 is doing between t2 and t3. It is not important to record or persist t0 and t1, but rather that code executing on Thread 1 between t0 and t1 can ask "What activity am I currently on?" and get the answer "A1" from the system.

The following discussion is derived from Activity Tracing and Sampling in Production (ATSP) documentation. ATSP documentation includes a specification for the following user story: "As a production diagnostics solutions provider, I want to be able to efficiently track a request on web applications which use async/await and/or the Microsoft® .NET™ thread pool (marks of Microsoft Corporation) so that I can provide intelligent monitoring and diagnostics information to my customers." Aspects of the ATSP software and/or documentation are consistent with or otherwise illustrate aspects of the embodiments described herein. However, it will be understood that ATSP documentation and/or implementation choices do not necessarily constrain the scope of such embodiments, and likewise that ATSP and/or its documentation may well contain features that lie outside the scope of such embodiments. It will also be understood that the discussion below is provided in part as an aid to readers who are not necessarily of ordinary skill in the art, and thus may contain and/or omit details whose recitation below is not strictly required to support the present disclosure.

ATSP documentation includes the following definitions:
APM: Application Performance Monitoring.
ETW: Event Tracing for Windows® (mark of Microsoft Corporation).
Activity or Basic Activity: a sequential unit of execution on a single thread.
Logical Activity: a set of basic activities which are part of the same flow of execution.
Causality Chain: a tree of activities, where the parent-child edges represent that a parent activity created a child activity.

With respect to technical problems addressed, ATSP documentation recognizes the challenge of providing diagnostics information which will help developers improve the performance of server and cloud applications. Improving the performance of their applications means that they can both lower their costs and provide a good experience to their users. For client applications, a per-process or per-thread aggregation of performance data such as CPU (processor) and memory allocations is almost always sufficient for improving performance. This is because a particular application is only servicing one user, and a period of heavy CPU usage or memory allocation will usually indicate a performance problem. Periods of heavy CPU or memory usage can be analyzed to find actionable work to improve the performance of the application.

On a web application, however, thousands of users may be serviced simultaneously by a single process. High CPU and Memory often means only that a lot of users are using the service. In order to provide meaningful and actionable information, performance data would be aggregated on a per-request basis. To provide data on a per-request basis, track all of the work a system is doing to complete a request. This is accomplished by having a method of identifying where the request started, where the request finished, and following the flow of execution in between. This is almost impossible to do for applications which use asynchronous programming models because a request will be split up into small units of execution which are interleaved with other requests on multiple threads. Some familiar tools can provide some data on a per-request view, but it is not general purpose (does not work everywhere) and is too high overhead (collecting too much data). At the same time, there are potential benefits to moving all production diagnostics solutions over to ETW-based technologies. ETW has many attractive features, one being that multiple profilers can be active at a given time. Currently production diagnostics solutions use the CLR profiling APIs which inject instrumentation into applications.

ATSP documentation presents a proposed solution from a technology perspective. First, as to Activity ID 208 Support, add support to EventSource for the existing ETW concept of an Activity ID. Every ETW event that is logged to the system has two fields: an activity ID, and a related activity ID. These fields are meant to be used for tracing requests, but they have no established guidance on how they are to be used. The traditional approach is to define a unique activity ID which represents the full request. For reasons discussed herein, establish the convention that a different activity ID will be used every time a request changes threads. One might think of these activities as a "basic activity". To make activity tracing work automatically for as many applications as possible, add EventSource instrumentation to the Task Parallel Library (TPL) and Microsoft® .NET™ thread pool (marks of Microsoft Corporation) which will set the activity ID and related activity ID field.

Consider how this works through a basic example of web service requests. Below is some pseudo-code for a web service that handles an http request, makes a request to a search server, a database server, and then returns a web page to the user.

```
async Task<string> HandleIncomingRequest(string url)
{
    // Activity 1
    var searchResults = await MakeSearchCall("search string");
    // Activity 2
    var dbResults = await MakeDataBaseCall("SELECT * FROM ...");
    // Activity 3
    return FormatHTML(dbResults, searchResults);
}
```

Every time execution is returned from an await call, it is possible to be on a different thread. We've marked each unit of execution which is guaranteed to stay on a single thread as Activity 1-3. See the diagram in FIG. 5 for a picture representing this code. To the system, this looks like three unrelated units of execution happening on the thread pool. The code above looks just like sequential code. It would be helpful to stich these units of work together so that diagnostics tools can provide a sequential view of the work being done to match the developer's sequential understanding of their code. In order to stitch all of this work together, set an activity ID 208 for each unit of execution and log 356 an event indicating when a new activity is created. One may refer to the activities 124 and the relationships between them as a causality chain. The stream of events can then be post-processed to form a logical activity 124, which is a set of activities which are part of the same flow of execution.

Figure 6:
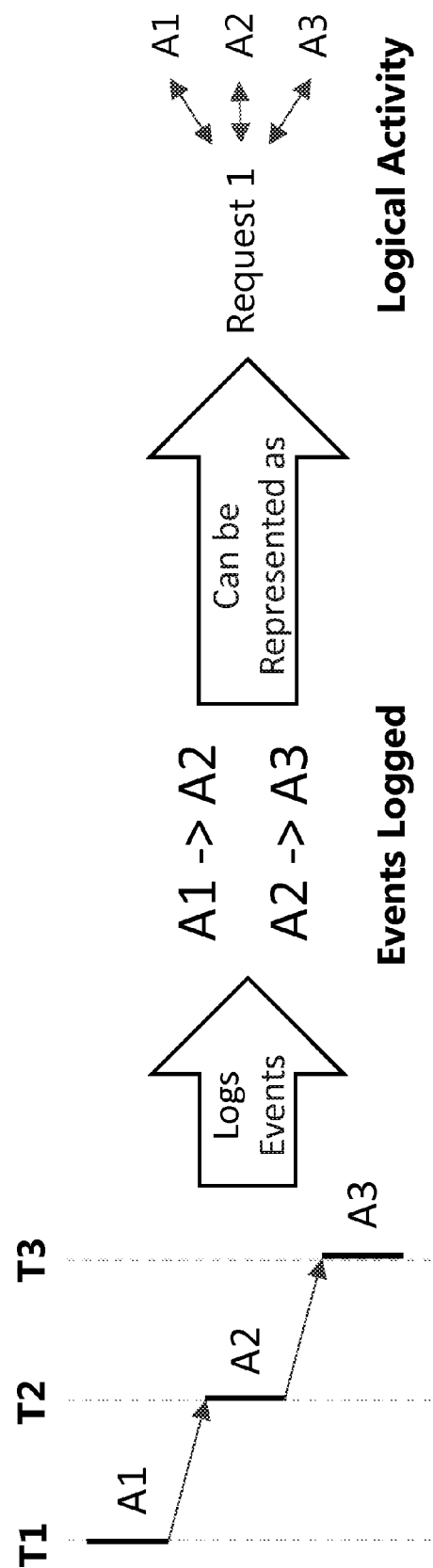
FIG. 6 is a diagram illustrating connections between thread activities, event logged, and logical activities.

One example of this processing is shown in FIG. 6. Imagine the thread view on the left of FIG. 6 without the labels and arrows, making it difficult if not impossible to know for certain that these units of work were related. Instead, the activity ID for each unit of execution will be set by using a new static method EventSource.SetCurrentThreadActivityId( ) and the events logged when a new activity is created will be generated by calling a new instance method EventSource.WriteEventWithRelatedActivityId( ) The TPL will be the main library calling these application program interfaces (APIs), but in this implementation any code which schedules work on other threads would call these APIs as well.

In some implementations, any interesting events logged during the course of the request, such as instrumentation in the web framework or various libraries used, will be automatically tagged with an activity ID. A useful example of this is an exception: if an exception event is thrown it will be tagged automatically with the correct activity ID. The ID can be used to determine what logical activity each logged event belongs to. FIG. 7 contains an example of the set of events which might be logged from the example web request. This case assumes that the libraries the developer is using log start/stop events for the request and call out to the search service and database service. One can then define a logical activity as all of the activities that were created between the request start and stop event (i.e., A1, A2, and A3). Since the database and search events are tagged with activity IDs, one can relate the database and search calls back to the request and determine interesting information such as how much time on the request was spent waiting on the database and search service.

With regard to sampling, ATSP documentation presumes that activity tracing will be used in production, and in particular will be used by monitoring agents which want to run with minimal overhead (1-2% CPU). With potentially thousands of requests per second being processed by a single machine it will be computationally expensive to emit events for every activity transition on every request. To reduce the amount of overhead but still provide high value information, some implementations allow sampling of activity events at the logical activity level. Events are turned off, and then on a request start events will start being logged, but only for that basic activity and the logical set of activities created by that basic activity. FIG. 8 shows two requests being run on the system at a time, and shows how sampling would reduce the amount of information generated by the system. This allows the APM to sample requests on the system, but for a sampled request still get full fidelity of information. The sampling and sampling frequency will be configured by providing a set of parameters to the EventSource provider when it is turned on either via the ETW system or through an EventListener. In some implementations, this activity sampling will only work for EventSource based instrumentation.

In some implementations, one can trace activity causality with anything that uses the TPL and/or the ThreadPool (Microsoft® .NET™ thread pool; marks of Microsoft Corporation). A developer can retrieve 324 the activity ID of the currently executing thread. One can interoperate with other systems which are also making use of the activity field ID, possibly with different conventions. Activity tracing is pay-for-play: it has zero overhead when the TPL and ThreadPool providers are turned off. Third parties can support activity tracing in libraries that schedule work on threads without using the TPL or Thread Pool.

In some implementations, it is possible to sample events for a single request in the system without other requests logging events. One can configure any event on an EventSource combination to act as the sampling starting point for an activity chain. Sampling has zero overhead when sampling is turned off and normal EventSource logging is turned on. In some cases, it is possible to configure the sampling rate to achieve <1-2% overhead in the system (<5,000 ETW events per second). As an invariant, turning on sampling has lower overhead than not sampling. In some cases, new features will be available through both the in-process EventListener and out-of-process TraceEvent/ETW consumers of events.

In some implementations, instrumentation in the Microsoft® .NET™ framework 128 is added to support out-of-the-box request tracing, such as a supported version of the TraceEvent library, EventSource based request start/stop events in ASP.NET and HttpClient (marks of Microsoft Corporation). A sample agent turns on activity tracing and sampling. Some configurations may include: Out-of-process, ETW-based agent; In-process, EventListener agent; In-process, EventListener agent which does not use filtering but operates in "flight-recorder" mode instead. Flight-recorder means that the agent will log all the transition events, and will write them out via an ETW event when an interesting event happens.

ATSP documentation includes a functional design. With regard to activity tracing, in some implementations an activity is a concept used in ETW to correlate a bunch of events together which would otherwise look unrelated. Every ETW event emitted has a field for an activity ID, and a related activity ID. Traditionally a single web request in a system would have one activity or a small number of activities (one per component, for example). The activity ID is a thread-local variable, so once the activity ID is set on a thread, all of the events logged on that thread will contain the activity ID. When another component creates its own activity ID, the related activity ID field is used to relate the two activities together. An event containing both the parent and the child activity ID is known as a transfer event.

However, these semantics make parts of user code responsible for generating activity IDs, passing the ID around, and owning the lifetime of that ID. They also means that one decides at development time the granularity of diagnostics information for a request. For example, ASP.NET's process request method may want to define the entire request as a single activity. The request might be composed of many operations occurring in parallel (database calls, mining data, rendering text, and etc.). It could be useful to isolate the effects of a single parallel operation as part of a request, in which case one would want to assign an activity ID to that parallel operation. The application and framework developer do not automatically take this into consideration when they write their code. Libraries and web frameworks might not implement an activity ID tracing system.

Instead of trying to reason about all of these complex questions, flip the problem on its head. Break down execution on the system into the smallest desirable units of granularity: an activity is a sequential unit of execution on a thread. Create the rule that that any time execution continues on a different thread, an implementation will create a new activity and generate a transfer event. At the time the transfer event is written, the new activity is the child activity (set in the related activity ID field of the event), and the original activity is the parent activity (set in the activity ID field of the event).

This approach allows developers to decide at analysis time (i.e., during and/or after program execution) what groupings of work are interesting for the purposes of their analysis. The tooling can form "logical activities" out of any set of basic activities, as suggested in FIG. 6. The parallelized workers rendering the HTML can all be viewed and analyzed independently or as a whole, whatever the developer needs to diagnose their performance issues. The burden on most of application and framework developers is much smaller with this approach: they merely indicate that certain parts of their application are interesting, by invoking start/stop event procedures 206. These events can mark the start and stop of requests, start and stop of HTML rendering, or whatever is likely to be interesting. These events can be added after-the-fact (since most developers realize they need these things afterwards) with very few lines of code 122 and without large disruptions to their code-base. If it becomes standard for the library and framework developers do this relatively small amount of work, then most app developers will not need to do anything to their applications. Once this pattern becomes mainstream, gone will be the days of developers having to actively manage their "end-to-end tracing context" and stuffing GUIDs into method parameters.

With regard to activity sampling, another design consideration is the volume of events vs. the value of the data. When one faces a web service that has 10,000 requests per second, one can get almost as valuable information from collecting data from 10-100 requests/second as one can by collecting data from all of the events. A technical problem is that one cannot just blindly throw out events: for any request being sampled it is most useful to have all of the events for that request. To provide highly valuable data at low volume overhead, some implementations will turn on sampling on an activity and any child that is created by that activity. This is illustrated in FIG. 8. A logical place to start sampling is when an interesting event is fired (such as a start event), so some implementations support the ability to configure a sampling start event 222.

With regard to design architecture, Microsoft® .NET™ 4.5 environments (marks of Microsoft Corporation) include an added abstraction for the logging of ETW events with an EventSource class. Using this class one can log events to an out-of-process listener through the ETW system in Windows. To read instrumentation in-process, the EventListener class for reading events generated by EventSource classes was introduced.

In some embodiments, methods for writing out transfer events will be added to the EventSource class. The transfer events will be consumable by ETW and EventListeners. Some embodiments also add static methods to EventSource which allow the setting and retrieval of the activity ID on thread local storage. To make sampling possible, there will be a per-listener filter. An ETW session and an EventListener are instances of listeners and have their own filter. The filter will either allow all events to pass, or selectively allow events to pass based on the activity ID on the event. The filter is a conceptual detail which is not directly accessible to the developer. The propagation of events from EventSources, through filters, and to listeners is illustrated in FIG. 9.

Figure 9:
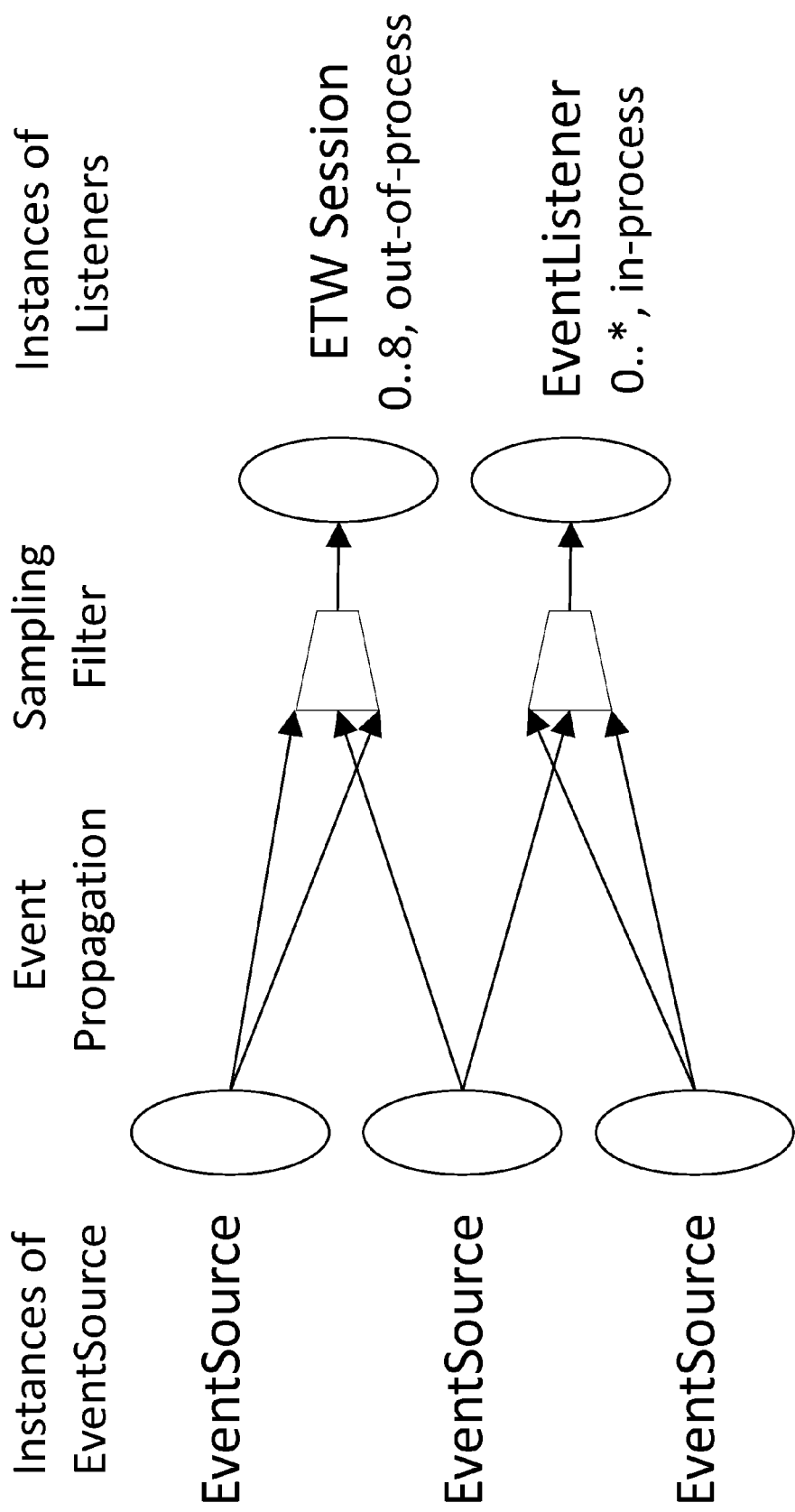
FIG. 9 is another architectural diagram illustrating aspects of activity-based sampling of diagnostic data.

In embodiments according to FIG. 9, each connection from an event source to a filter, and the set of events which pass through the filter, is configured independently. Configuration is done by EventListener.EnableEvents in the case that the listener is an event listener, or through the TraceEvent EnableEvents( ) in the case that the listener is ETW. Only four ETW sessions can use sampling, an implementation limitation imposed by the method being used for routing sampled events to ETW sessions. There is only ever one ETW Listener, but there can be many EventListener instances. The capabilities of an EventListener is to match the capabilities of an ETW listener.

ATSP documentation includes detailed implementation information, which is reproduced below. As noted, however, embodiments are not limited to ATSP implementations, and ATSP documents and implementations contain details which are not necessarily required in a given embodiment.

Changes to EventSource Class

These are changes to the Systems.Diagnostics.Tracing.EventSource class to support the Activity tracing and Sampling features.

Intuitively one expects to be able to pass in an EventCommand.Update to event sources to alter the args that are currently active on it (to vary the activity filtering and whatnot). In its current state this is not a possibility. Also, when writing EventSource methods, the WriteEvent begins at 1. There is a mapping between the event-ids and the methods themselves that is exactly 1-1. Any variation in this causes an exception. Also, having a method like MyEvent( ){WriteEvent(1, "HOWDY!");} throws an exception that doesn't explain why the case is failing.

New SetCurrentThreadActivity Method

There are two overloads of this new method. Signature: public static void SetCurrentThreadActivityId(Guid activityId) Parameters: activityId: the activity ID to set active on the current thread.

This method is used to set the current activity ID on thread local storage. This causes any events on the same thread to be tagged with the provided activity ID until a new activity is started on the same thread. Very few people will actually use this API. The implementer will call it from its own task library, and only libraries that are managing their own threads would do so. A thread is often doing work "on behalf of" the caller, so conceptually calling this method tells the diagnostics tools who to charge for the work being done. Calling SetCurrentThreadActivityId (Guid.Empty) means that work on the current thread will not be associated with any activity until SetCurrentThreadActivityId is called with a valid activity ID. This may be desired if for some reason the caller wants to break the causality chain and/or exclude child activities from the activity filter. Signature public static void SetCurrentThreadActivityId(Guid activityId, out Guid oldActivityThatWillContinue)
Parameters activityId: the activity ID to set active on the current thread.
oldActivityThatWillContinue: the previously active activity ID on the current thread.

This version of the overload is to be used to overwrite someone else's activity id on the current thread. It returns the old activity id through the out parameter oldActivityThatWillContinue. After calling this API, call SetCurrentThreadActivity(oldActivityThatWillContinue) before returning control back to owner of the activity id being overwritten. It has the same behavior as above otherwise. Calling SetCurrentThreadActivityId(0, out Guid) allows one to reuse the current activity id in a subsequent SetCurrentThreadActivityId call and have sampling flow to that call. An activity will only be removed 338 from the filter table when its activity ID is set on a thread and SetCurrentActivityId(Guid) is called.

New CurrentThreadActivity Property Signature public static Guid CurrentThreadActivityId {get;} Parameters Returns: the activity ID on the current thread.

Used to retrieve the current activity ID on thread local storage. In some cases it may be desirable to get the activity ID without having to listen to a stream of events. This method is used for a scenario including correlating information with ETW/EventSource events and without using ETW/EventSource to store that information.

New WriteEventCreatingRelatedActivityId Method Signature protected unsafe void WriteEventWithRelatedActivityId(int eventId, Guid relatedActivityId, params object[ ] args) Parameters eventId: an id uniquely representing this event within the EventSource (not the instance of the event!) relatedActivityId:
If the event is being written by the parent (sender semantics), then this is the ID of the child activity created by this activity.
If the event is being written by the child (receiver semantics), then this is the ID of the parent activity that created this activity.
args: the payload of the event. Can be null if just the create child information is needed, but often there is an event that co-incides with the creation of a child activity.

Logs an event to indicate the current activity is related to another activity with the provided relatedActivityId. The activity of the current thread will be logged with the event, allowing for two activities to be related together by the consumer of events. This is known as a "transfer event".

A difference between sender and receiver semantics is the time at which the transfer event is written. Sender semantics means that the parent will log transfer events before it is completed. With Sender semantics one will know all of the children of an activity before it's completed, and this makes continuation of activity sampling possible. Receiver semantics means that the child activities write transfer events, possibly after their parent completes execution. This means that one does not know the full set of children for a parent before the parent activity has completed execution, and it is not possible to turn on sampling for child activities with receiver semantics.

The event that is calling this method will have either the EventOpcode.Send or the EventOpcode.Receive opcode set in the attributes for the event. These opcodes declare whether sender or receiver semantics are being used. The sampling feature will only work with sender semantics in this implementation, so one will provide guidance to developers to use the Send opcode. If no activity is active on the current thread a new activity will be created before the event is written out. If sampling is active for the current ActivityId, and the EventOpcode.Send opcode is specified for the event, sampling will also be enabled for the RelatedActivityId. This call can optionally include an event payload in the case that the act of creating a child activity coincides with another diagnostics event in the application (e.g., the TaskScheduled event). Making too many calls to this method without calling SetCurrentThreadActivityId( ) on the activity IDs may eventually break sampling. This is an implementation detail that may be included to prevent memory leaks from getting out of control. If the event attributes do not specify either the Eventopcode.Send or EventOpcode.Receive then the method will throw an exception.

New WriteEventCore Overload
Signature protected unsafe void WriteEventWithRelatedActivityIdCore(int eventId, Guid* relatedActivityId, int eventDataCount, EventSource.EventData* data)
Parameters eventId: an id which uniquely identifies the event being written (not the instance of the event!)
relatedActivityId: a pointer to the guid of the child activity id.
eventDataCount: the number of entries in the data field.
eventData: a pointer to the first argument in the event data field.
This is a more performant version of 6.4.3, saves on having to box and unbox the relatedActivityId and the event payload (args).

Updated IsEnabled Method
Existing
Signature public bool IsEnabled(EventLevel level, EventKeywords keywords)
Parameters level: the level to use when determining if the event source is enabled.
keywords: the keywords to use when determining if the event is enabled.
Previous behavior: returns true if the event is likely to be logged for the provided level and keywords. New behavior: Same as before, except it will return false if this event will not be written to any listeners because of sampling. This can be used to avoid expensive computation in the case that an event will be suppressed as a result of sampling. It's also part of the cross-machine tracing story: a machine can send a token over the wire to another machine when a request is being sampled. This allows for sampling to continue on the other machine for the same request. A variation includes issuing a callback to form the event in the case that it has been determined the event will be written. In some embodiments, using IsEnabled or a similar mechanism helps reduce overhead and facilitate machine-to-machine sampling. For example, some embodiments include a SamplingEnabled flag and/or header in http communications if the http request originated from a log-enabled activity.

Updated GenerateManifest Behavior

---

Existing
Signature     public static string GenerateManifest(
    Type eventSourceType,
    string assemblyPathToIncludeInManifest
)
Parameters eventSourceType: the type of the event source.
assemblyPathToIncludeInManifest: the path to the .dll file to include in the manifest.

---

Current behavior: writes out the schema of event data for an event source by inspecting the parameters of methods on the EventSource class. Updated behavior: if the first method parameter is a GUID named 'RelatedActivityId' (case insensitive) then it is ignored. This allows the related activity id to be written to the existing RelatedActivityId field (which is not part of the event payload) without parsers expecting to see the field in the event payload.

New ConstructionException Property Signature public Exception ConstructionException {get;} This property is used to gather exceptions that happened during construction of the event source. This is added because logging is often optional and thus is not to generate fatal errors (exceptions), and because EventSources are often initialized in class constructors (which propagate exceptions poorly).

The event source constructor does not throw exceptions. Instead this implementation remembers any exception that was generated (it is also logged to Trace.WriteLine).

New Properties on EventWrittenEventArgs
The System.Diagnostics.Tracing.EventWrittenEventArgs class is passed to the EventListener.OnEventWritten( ) callback and contains the event information written out by an event source. Two properties are added to this class so that the activity Id and related activity id can be read for in-process consumers of events.

New ActivityId Property
Signature public Guid ActivityId {get; internal set;}
Description Returns the activity id on the thread that the event was written, at the time the event was written.

Accessing the ActivityId field will cause an access to thread local storage (uses a p/invoke). This has some implications. This EventWrittenArgs field is only valid for the duration of the OnEventWritten( ) callback. This is the only time that the TLS variable will have the correct activity Id value. Also, if the activity Id is changed during the callback, then this will cause the returned activity ID returned by this property to be invalid.

New RelatedActivityId Property
Signature public Guid RelatedActivityId {get; internal set;}
Description If this is not Guid.Empty, it means that the activity id for the event is related to another activity.

The convention for .NET framework code is that the RelatedActivityId is a child activity caused by the ActivityId of the event. There will be a 1-many relationship of activity id→related activity ids.

Extending EventListener/ETW EnableEvents Behavior
The System.Diagnostics.EventListener class will be extended to be able to configure sampling. The EnableEvents method on this class accepts a dictionary of arguments for extensibility. This implementation will use these extensibility arguments to enable sampling in a way that will be supported by both EventListeners and ETW.

The "APIs" in these sections are defined in terms of the fields in the arguments parameters of the existing EventListener.EnableEvents method (shown below).

---

```
public void EnableEvents(
    EventSource eventSource,
    EventLevel level,
    EventKeywords matchAnyKeyword,
    IDictionary<string, string> arguments
)
```

---

This method also has a corresponding TraceEvent.EnableProvider( ) call. This implementation reserves 4 bits of EventKeywords for out-of-process ETW sessions. These keywords will be specified in the matchAnyKeyword field of the out-of-process ETW sessions so that sampled events 202 can be routed to the correct session. This means that sampling cannot be turned on for more than 4 ETW sessions in this implementation. TraceEvent will co-ordinate ownership of these keywords through the windows registry. If a $5^{th}$ session enables a provider for sampling, TraceEvent will not be able to find an available keyword and will throw an exception.

StartSamplingWithEvent
This implementation will provide a standard "StartSamplingWithEvents" argument which can be used to configure one or more events used to start sampling.

---

Convention   arguments["ActivitySamplingStartEvents"] = "<sampling-config>";
<sampling-config> ::=
    | <event-config> <event-config-list-tail>
<event-config-list-tail> ::=
    | " " <event-config>
<event-config> ::= <event-specifier>
    | <event-specifier> ":" <sample-rate>
<event-specifier> ::= <string>
    | <int32>
<sample-rate> ::= <positive int>

---

Fields event-specifier: is either the text name of an event, or the numerical id of the event.
sample-rate: indicates how often sampling is to be started when this event is seen. "Every nth event is fired starting with the first". More formally: sampling will be started every n/<sample-rate> times the event 202 is seen, where n is the number of times the event is fired when sampling is not started. If sampling was already started when this event is seen, it does not count towards n.

The ETW listener will mirror the same functionality, but will be configured out-of-process by using TraceEvent.EnableEvents( ) When the start event configuration changes, the updated setting be logged to ETW using a string message so that the reader of the logs knows what frequency of data is being reported. Multiple calls to this method will override the previous sampling start event configuration for a given EventListener or ETW session. Calling EnableEvents without the ActivitySamplingStartEvents argument, or with a value of " " will turn on the provider with no sampling. When the event is fired, activity sampling starts with the activity the event was fired on, and will continue for all child activities of that activity. When start events are configured, the ActivitySampling argument will be set to true for this event source so that events are only logged at the desired sampling frequency. If the sampling-config field is invalid then this implementation will report an error into the ETW stream through a string log message. It will attempt to parse as much of the sampling string as possible, and will configure sampling for the events with a valid specification.

ActivitySampling

This implementation provides a standard "ActivitySampling" argument which can be used to configure an event source so that it only logs when sampling is enabled for the current activity.

Convention arguments["ActivitySampling"]="true" I "false"
Fields If true this event source will only report events when sampling is active for the current activity. The default is false.

Calling this parameter multiple times will override the previous set value. This value is configured per EventListener and per-ETW session.

Instrumentation of Task Parallel Library (TPL)

Part of this feature will instrument the TPL to create the causal activity chain. One may opportunistically instrument other areas of the core framework (e.g., timers, GUI thread operations, or QueueUserWorkItem). The TPL is already instrumented using EventSource class. There are two existing events which coincide with the creation of child activities:

---

TaskScheduled
    Logged when a task schedules another task to run.
    Event ID 7
    Payload description (in terms of TraceEvent classes):
        public sealed class TaskScheduledArgsTraceData : TraceEvent
        {
            public int OriginatingTaskSchedulerID { get; }
            public int OriginatingTaskID { get; }
            public int TaskID {get; }
            public int CreatingTaskID { get; }
            public int TaskCreationOptions { get; }
TaskWaitBegin
    Logged when a task waits on asynchronous I/O.
    Event ID 10
    Payload description:
    public sealed class TaskWaitBeginArgsTraceData : TraceEvent
        {
            public int OriginatingTaskSchedulerID { get { return GetInt32At(0);
}}
        public int OriginatingTaskID {get {return GetInt32At(4); } }
        public int TaskID { get { return GetInt32At(8); } }

---

These events will now be logged using the WriteEventCreatingRelatedActivity( ) API, and will use a GUID generated from the OriginatingTaskID as the RelatedActivityId. Additionally, a new Tasks.Keywords.TaskTransfer keyword will be added which can be used in combination with the Informational verbosity level to turn on only these two events.

When the related task begins execution, the EventSource.SetCurrentThreadActivityId( )method will be called with the RelatedActivityId. With these modifications to the TPL instrumentation this implementation will be able to follow execution causality for most applications.

Example Code. Several pieces of illustrative pseudo-code are provided below to illustrate the concepts indicated. One of skill will understand that changes may be needed to translate from pseudo-code to a commercial implementation.

Adding Activity Tracing Support to a Thread-Hopping Library

The following code illustrates what a developer of a library that manages its own thread-scheduling would have to do to flow activity causality. Fundamentally they just write a transfer event and set the activity ID at the right point in time.

---

```
// Used to write out the activity transfer event
class LibraryInstrumentation : EventSource
{
    // Specify use of sender semantics for activity sampling
    // to continue when the work is scheduled.
    // Use "relatedActivityId" as the parameter name so that it is not
    // included in the event schema.
    [Event(1, Level = EventLevel.Informational, Opcode = EventOpcode.Send)]
    public void ScheduleWork(Guid relatedActivityId)
    {
        WriteEventWithRelatedActivityId(1, relatedActivityId, null);
    }
    public static LibraryInstrumentation Instance = new LibraryInstrumentation( );
}
class WorkScheduler
{
    // call from any thread 126 to schedule work onto a worker thread 126
    public void ScheduleWork(WorkCallback workCallback)
    {
        Guid workId = new Guid( );
        Work work = new Work(workId, workCallback);
        LibraryInstrumentation.Instance.ScheduleWork(workId);
        // enqueue the work item so that it is later passed to StartWork
        _workQueue.Enqueue(work);
    }
    private void StartWork(Work work)
    {
        // set the current activity 124 to the activity Id 208 in the worker object
        Guid oldActivityId;
        EventSource.SetCurrentThreadActivityId(work.WorkId,
        out oldActivityId);
        try
        {
            work.WorkCallback( );
        }
        finally
        {
            // restore the old activity ID in case code stomped over an existing one
            // that was set by the task library
            EventSource.SetCurrentThreadActivityId(oldActivityId);
        }
    }
    ...
```

---

The following code demonstrates how a library would use SetCurrentThreadActivityId if it owned the thread completely.

---

```
void RunWorkLoop( )
{
    while (true)
    {
        if (_workQueue.Count > 0)
        {
            var work = _workQueue.Dequeue( );
```

```
        EventSource.SetCurrentThreadActivityId(work.WorkId);
        work.WorkCallback( );
      }
      else
      {
        // no work being done on this thread
        EventSource.SetCurrentThreadActivityId(0);
        Thread.Sleep(10);
      }
    }
  }
```

The following example demonstrates use of former activity id semantics, which generates one activity ID for an entire request and passes it around to all the threads. The usage of the SetCurrentThreadActivity API is a bit unnatural in this case, but that does encourage developers to use the conventions shown in the code samples above.

```
// This method represents a 1..N different methods that are called to complete
// a request. Each method will want to set the activity id to the id found in
// the request context, and at the end of each method they have to indicate that
// they want the activity id to remain active so that sampling will work when
// they set the activity in other method calls.
void RequestStepsOneThroughN(RequestContext context)
{
  Guid oldActivityId;
  // set the thread activity to the request id
  EventSource.SetCurrentThreadActivityId(context.RequestId, out oldActivityId);
  try
  {
    // do the work
  }
  finally
  {
    // restore the old activity id, but keep the request activity id active so that
    // subsequent steps of the request can be sampled
    Guid temp;
    EventSource.SetCurrentThreadActivityId(oldActivityId, out temp);
  }
}
// The final step of the request will have to indicate that the activity id is no
// longer needed so that it is not tracked by event listeners.
void RequestStepFinal(RequestContext context)
{
  Guid oldActivityId;
  EventSource.SetCurrentThreadActivityId(context.RequestId, out oldActivityId);
  try
  {
    // do final request step
  }
  finally
  {
    // After this method the activity id for the request is no
    // longer needed, so one can call the version of the API that does
    // not continue tracking the current activity id.
    EventSource.SetCurrentThreadActivityId(oldActivityId);
  }
}
```

In-Process Event Filtering

The following code shows how a developer would create an EventListener to turn on the TPL provider and configure sampling to occur every $100^{th}$ time an ASP.NET request started.

```
// this class listens to event sources and tracks the start and stop of
ASP.NET requests
public class TaskEventListener : EventListener
{
  public TaskEventListener( )
  {
    foreach (var source in EventSource.GetSources( ))
    {
      if(source.Name == "AspNetEventSource")
      {
        Dictionary<string, string>arguments = new
        Dictionary<string,string>( );
        // Frequency condition 226: Sample every 100 ASP.NET
requests and every time a correlation header is seen
        arguments["ActivitySamplingStartEvents"] =
        "AspNetReqStart:100
          CorrelationHeaderPresent:1";
        EnableEvents(source, EventLevel.Informational,
          EventKeywords.None, arguments);
      }
      else if (source.Name == "TplEtwEventSource")
      {
        Dictionary<string, string>arguments = new
        Dictionary<string,string>( );
        // Only log TaskScheduled events, and only log them during
sampled requests
        arguments["ActivitySampling"] = "true";
        EnableEvents(source, EventLevel.Informational,
          ProviderHelper.Keywords.TransfersOnly, arguments);
      }
    }
  }
  // gets called every time an event source writes an event that this listener
is listening to
  protected override void OnEventWritten(EventWrittenEventArgs
    eventData)
  {
    // check event ID first
    if (eventData.EventSource.Guid == ProviderHelper.
      TplEventSourceGuid
      &&
      eventData.EventId == ProviderHelper.TaskCreatedEventId)
    {
      RecordActivityCausality(eventData.ActivityId,
eventData.RelatedActivityId);
    }
    else if (eventData.EventSource.Guid ==
ProviderHelper.AspNetEventSourceGuid)
    {
      if (eventData.EventId == ProviderHelper.AspNetReqStartEventId)
      {
        RecordRequestStart(eventData.ActivityId);
      }
      else if (eventData.EventId == ProviderHelper.
        AspNetReqStopEventId)
      {
        RecordRequestStop(eventData.ActivityId);
      }
    }
  }
}
```

Out-of-Process Agent

The following code shows how TraceEvent can be used to turn on the TPL provider and configure 332 sampling to occur every $100^{th}$ time a request start event 222 is fired.

```
public void StartAgent( )
{
  TraceEventSession session = new
TraceEventSession("RealTimeTestSession", null);
  // configure sampling to sample every 100th ASP.NET request
  Dictionary<string, string> samplingTriggerConfig =
new Dictionary<string, string>( );
  samplingTriggerConfig["ActivitySamplingStartEvents"] =
"AspNetReqStart:100";
  session. EnableProvider(AspNetTraceEventParser. ProviderGuid,
```

-continued

```
        TraceEventLevel.Informational, 0, 0, TraceEventOptions.None,
samplingConfig);
        // turn on the TPL provider to get the transfer events when current
          activity
        // is being sampled
        Dictionary<string, string>samplingEnableConfig = new
Dictionary<string, string>( );
        samplingTriggerConfig["ActivitySampling"] = "true";
        session.EnableProvider(TplEtwProviderTraceEventParser.
        ProviderGuid,
        TraceEventLevel.Informational, 0, 0, TraceEventOptions.None,
samplingEnableConfig);
        TplEtwProviderTraceEventParser tpl = new
TplEtwProviderTraceEventParser(etwSource);
        tpl.TaskScheduled += parser_TaskScheduled;
    }
    private void tpl_TaskScheduled(TaskScheduledArgsTraceData obj)
    {
        RecordActivityCausality(obj.ActivityID, obj.RelatedActivityID);
    }
```

ConstructionException

The following code demonstrates how one would use the ConstructionException to check for exceptions.

```
public class EventSourceTest : EventSource
{
    // This is our standard example for using EventSource
    public void Message(string arg1) {WriteEvent(1, arg1); }
    static public EventSourceTest Log = new EventSourceTest( );
};
public class Program
{
    static void Main(string[ ] args)
    {
        // To catch errors during construction, do it explicitly.
        // By default Exceptions are not thrown. Thus in debug code at least,
        // check for failure.
        // If there is a good place to log the error, do that.
        if (EventSourceTest.Log.ConstructionException != null)
            throw EventSourceTest.Log.ConstructionException;
        EventSourceTest.Log.Message("Hello");    // a normal use of logging.
    }
}
```

One may ask why this implementation creates an activity ID for every thread transition, when passing around a single GUID for a request is easier for tools and has less events emitted at runtime. However, this approach trades a bit of performance to make the feature more useful and generally available to applications. Using a single activity ID means that the developer explicitly creates an activity ID at a logical point of execution in their application. Additionally, there may be multiple components in the application that want to identify units of execution as a unique activity and will have to co-operate. The design here is transparent to the developer, and will allow one decide after the fact where an activity begins and ends, depending on the type of analysis one wishes to do. This can involve more complexity for the tool/profile vendor, however this could be eased by providing code that re-writes the activity IDs to logical activities based on a configuration of start and stop events.

CONCLUSION

Although particular embodiments are expressly illustrated and described herein as processes, as configured media, or as systems, it will be appreciated that discussion of one type of embodiment also generally extends to other embodiment types. For instance, the descriptions of processes in connection with FIG. 3 also help describe configured media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Reference herein to an embodiment having some feature X and reference elsewhere herein to an embodiment having some feature Y does not exclude from this disclosure embodiments which have both feature X and feature Y, unless such exclusion is expressly stated herein. The term "embodiment" is merely used herein as a more convenient form of "process, system, article of manufacture, configured computer readable medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole.

Reference has been made to the figures throughout by reference numerals. Any apparent inconsistencies in the phrasing associated with a given reference numeral, in the figures or in the text, are to be understood as simply broadening the scope of what is referenced by that numeral. Different instances of a given reference numeral may refer to different embodiments, even though the same reference numeral is used.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims and the abstract, as filed, are part of the specification.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A computer system configured for activity-based sampling of diagnostic data, the system comprising:
   at least one processor;
   a memory in operable communication with the processor(s); and
   a set of event definitions residing in the memory and defining events;
   an application residing in the memory and having application code which is configured to invoke at least one log-event procedure;
   a current activity-id which specifies whether an activity of the application is currently designated, and when some activity is currently designated also specifies which activity is currently designated; and
   a logger residing in the memory and having logger code which is configured to interact with the processor and memory to check a set of specified logging conditions and send a log entry to a log in response to invocation of a log-event procedure when at least one specified logging condition is satisfied;
   the logger including a set of log-enabled activities, and also including a set of one or more start-events with respective sampling frequency conditions, each start-event also being an event which is defined in the set of event definitions;
   the specified logging conditions including (a) a first condition specifying that the current activity-id is present in the set of log-enabled activities, and also including (b) a second condition specifying that the current activity-id is absent from the set of log-enabled activities, that the log-event procedure identifies a start-event, and that the invocation of the log-event procedure is consistent with the sampling frequency condition of the start-event.

2. The system of claim 1, wherein the set of one or more start-event sampling frequency conditions includes at least one of the following:
   a sampling frequency condition specifying that the invocation of the log-event procedure be an Nth logging attempt for a start-event which has a sampling frequency of one log entry per N log-event procedure invocations;
   a sampling frequency condition specifying that there has been less than M start events within a specified period of time.

3. The system of claim 1, further comprising at least one set-activity-id procedure invocation configured to set the current activity-id, the set-activity-id procedure invocation(s) residing in at least one of the following: the application code, a framework which includes a runtime to support the application code.

4. The system of claim 1, wherein the application is a multi-threaded application, and the system further comprises a current thread-id which identifies a currently executing thread of the application during execution of the application, and at least one log entry containing the current thread-id as of creation of the log entry.

5. The system of claim 4, wherein the system further comprises a set of thread-ids with corresponding activity-ids, and wherein the logger code is configured to retrieve the current activity-id by looking up the current thread-id in the set of thread-ids to find the corresponding activity-id and use it as the current activity-id.

6. The system of claim 1, further comprising a log consumer having log consumer code which is configured to send a sampling configuration message to the logger to specify at least one event as a start-event and to specify the sampling frequency condition for that start-event.

7. The system of claim 1, further comprising a child-activity procedure invocation which is configured to notify the logger that a current activity is creating a child activity, and wherein the logger code is configured to add the child activity to the set of log-enabled activities in response to the child-activity procedure invocation.

8. The system of claim 7, further comprising a log which documents that the child-activity was created by an activity which was the current activity at the time of child-activity procedure invocation.

9. A computer-readable storage medium configured with data and with instructions that when executed by at least one processor causes the processor(s) to perform a technical process for activity-based sampling of diagnostic data in a computing system which includes a logger, the process comprising the steps of:
   configuring the logger with data which represents a set of log-enabled activities and with data which represents a set of start-events with respective sampling frequency conditions;
   noting data in the logger which associates a thread-id with an activity-id, the thread-id identifying a thread of the computing system, the activity-id identifying an activity which is performed at least in part by the identified associated thread;
   receiving in the logger an indication of a log-event procedure invocation by an invoking thread, the indication specifying an event;
   determining whether any activity represented in the set of log-enabled activities is currently an activity of the invoking thread;
   if any activity represented in the set of log-enabled activities is currently an activity of the invoking thread, then logging the event in a diagnostic data log of the computing system; and
   if no activity represented in the set of log-enabled activities is currently an activity of the invoking thread but the event is a start-event and the invocation of the log-event procedure satisfies the sampling frequency condition for the start-event, then logging the event in the diagnostic data log of the computing system and also adding the activity of the invoking thread to the set of log-enabled activities.

10. The configured computer-readable storage medium of claim 9, wherein the process further comprises providing a set of event definitions which define events, the providing step providing the event definitions to at least one of the following components residing in a memory in the computing system: an application, the logger, a log consumer; and wherein the event definitions specify a level-of-detail for at least one of the events.

11. The configured computer-readable storage medium of claim 9, wherein the process further comprises stopping logging for a particular activity in response to at least one of the following: seeing a stop-logging event, seeing a start-event on a log-enabled activity again after previously seeing that start-event has triggered logging for the activity.

12. The configured computer-readable storage medium of claim 9, wherein the process further comprises:
   setting a current activity-id in response to a set-activity-id procedure invocation in at least one of the following: an application in the computing system, a framework which includes a runtime to support the application; and wherein the current activity-id specifies whether any activity of the application is currently designated to be logged, and when some activity is currently designated also specifies which activity is currently designated.

13. The configured computer-readable storage medium of claim 9, wherein the process further comprises automatically adding to the set of log-enabled activities a child activity of a parent activity which is in the set of log-enabled activities, the adding step performed in response to receiving an indication—while the parent activity is in the set of log-enabled activities—that the child activity is a child of the parent activity.

14. The configured computer-readable storage medium of claim 9, wherein the process further comprises logging creation of a child activity by a parent activity which is in the set of log-enabled activities.

15. An automated technical process for activity-based sampling of diagnostic data in a computing system which includes a logger, the process comprising the steps of:

configuring the logger with data which represents a set of log-enabled activities and with data which represents a set of start-events with respective sampling frequency conditions;

noting data in the logger which associates a thread-id with an activity-id, the thread-id identifying a thread of the computing system, the activity-id identifying an activity which is performed at least in part by the identified associated thread;

logging creation of a child activity by a parent activity which is in the set of log-enabled activities;

receiving in the logger an indication of a log-event procedure invocation by an invoking thread, the indication specifying an event;

determining whether any activity represented in the set of log-enabled activities is currently an activity of the invoking thread;

if any activity represented in the set of log-enabled activities is currently an activity of the invoking thread, then logging the event in a diagnostic data log of the computing system; and if no activity represented in the set of log-enabled activities is currently an activity of the invoking thread but the event is a start-event and the invocation of the log-event procedure satisfies the sampling frequency condition for the start-event, then logging the event in the diagnostic data log of the computing system and also adding the activity of the invoking thread to the set of log-enabled activities.

16. The automated technical process of claim 15, wherein the process comprises associating a thread-id denoted here as Thread1 with an activity-id denoted here as Activity1, receiving in the logger an indication of a log-event procedure invocation by Thread1, the indication specifying an event denoted here as Event1, and avoiding logging Event1 because Activity1 is not in the set of log-enabled activities.

17. The automated technical process of claim 15, wherein the process comprises associating a thread-id denoted here as Thread1 with an activity-id denoted here as Activity1, receiving in the logger an indication of a log-event procedure invocation by Thread1, the indication specifying an event denoted here as Event2, and then logging Event2 even though Activity1 is not in the set of log-enabled activities because Event2 is a start-event, and also adding Activity1 to the set of log-enabled activities because Event2 is a start-event.

18. The automated technical process of claim 15, wherein the process comprises associating a thread-id denoted here as Thread1 with an activity-id denoted here as Activity1, receiving in the logger an indication of a log-event procedure invocation by Thread1, the indication specifying an event denoted here as Event3, and avoiding logging Event3 even though Event3 is a start-event, because the sampling frequency for Event3 is one log entry per N log-event procedure invocations and the invocation of the log-event procedure is not an Nth logging attempt for Event3.

19. The automated technical process of claim 15, wherein the process further comprises setting a current activity-id in response to a set-activity-id procedure invocation.

20. The automated technical process of claim 15, wherein the process further comprises stopping logging for a particular activity in response to seeing an event.

* * * * *